US006530087B1

(12) United States Patent
Kobayashi et al.

(10) Patent No.: US 6,530,087 B1
(45) Date of Patent: Mar. 4, 2003

(54) CABLE NETWORK SYSTEM WITH INGRESS NOISE SUPPRESSING FUNCTION

(75) Inventors: Hiroshi Kobayashi, Tokyo (JP); Katsumi Hirai, Tokyo (JP); Hiroyuki Ibe, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 163 days.

(21) Appl. No.: 09/640,989

(22) Filed: Aug. 18, 2000

Related U.S. Application Data

(63) Continuation of application No. 09/417,017, filed on Oct. 12, 1999, now Pat. No. 6,160,990, which is a continuation of application No. 08/717,296, filed on Sep. 20, 1999, now abandoned.

(30) Foreign Application Priority Data

| May 13, 1996 | (JP) | ............................................... 8-117954 |
| Jul. 23, 1996 | (JP) | ............................................... 8-193491 |
| Jul. 26, 1996 | (JP) | ............................................... 8-197949 |

(51) Int. Cl.[7] ............................................. H04N 7/173
(52) U.S. Cl. ...................................... 725/125; 725/121
(58) Field of Search ................................. 725/125, 121, 725/124; H04N 7/713, 7/14

(56) References Cited

U.S. PATENT DOCUMENTS

| 3,924,187 | A | * | 12/1975 | Dormans | ..................... 455/4.1 |
| 4,982,440 | A | * | 1/1991 | Dufresne | ..................... 455/5.1 |
| 5,719,792 | A | * | 2/1998 | Bush | ........................... 455/3.1 |
| 5,745,836 | A | * | 4/1998 | Williams | ..................... 455/5.1 |
| 5,765,097 | A | * | 6/1998 | Dail | ............................ 455/5.1 |

* cited by examiner

*Primary Examiner*—Sherrie Hsia
(74) *Attorney, Agent, or Firm*—Oblon, Spivak, McClelland, Maier & Neudstadt, P.C.

(57) ABSTRACT

In a cable network system of this invention, GSUs are installed in almost all subscriber residences. A G-STB or a G-MDM is set for a subscriber who wants to receive bidirectional services. Alternatively, an NGA is attached to an existing N-STB or N-MDM. The presence of an upward transmission signal from an in-home device is monitored in the G-STB, the G-MDM, or the NGA. While the upward transmission signal is detected, a transmission indication signal is supplied to the GSU. Only while the transmission indication signal is detected, the GSU sets a gate switch in an ON state. On the other hand, while no transmission indication signal is detected, the GSU keeps the gate switch in an OFF state.

13 Claims, 22 Drawing Sheets

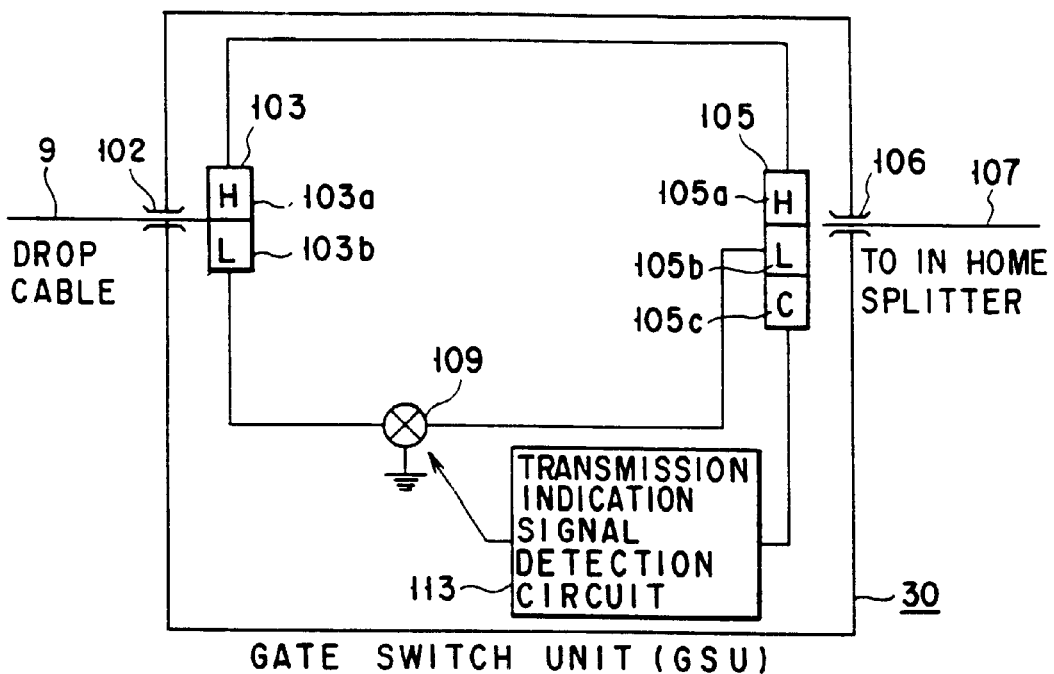
F I G. 2
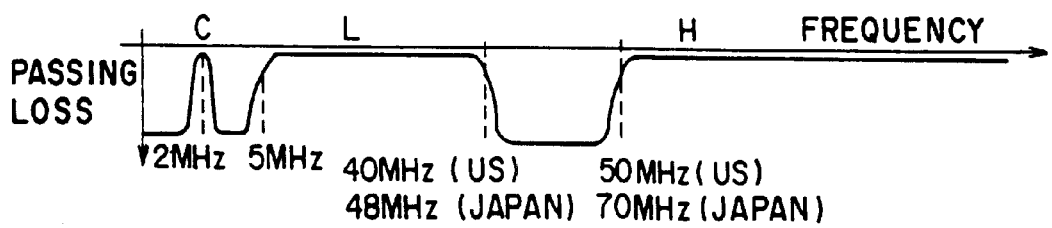
F I G. 3
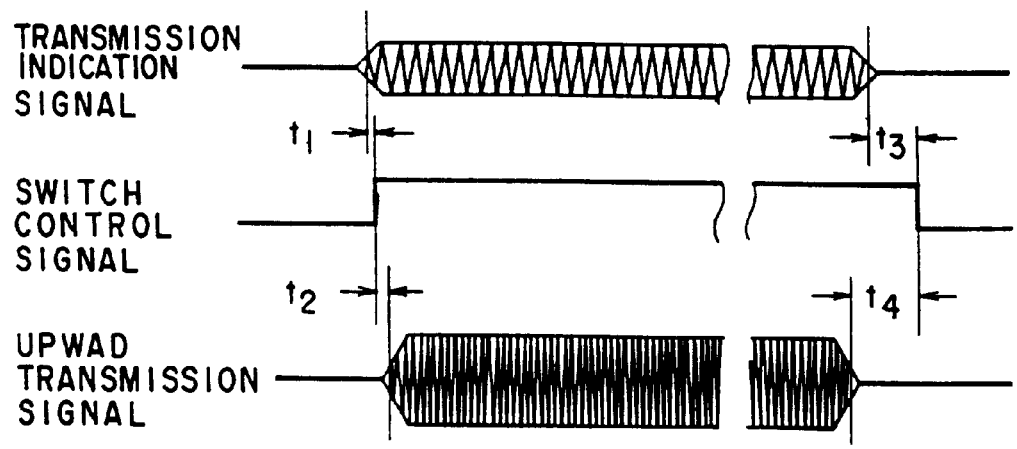
F I G. 4

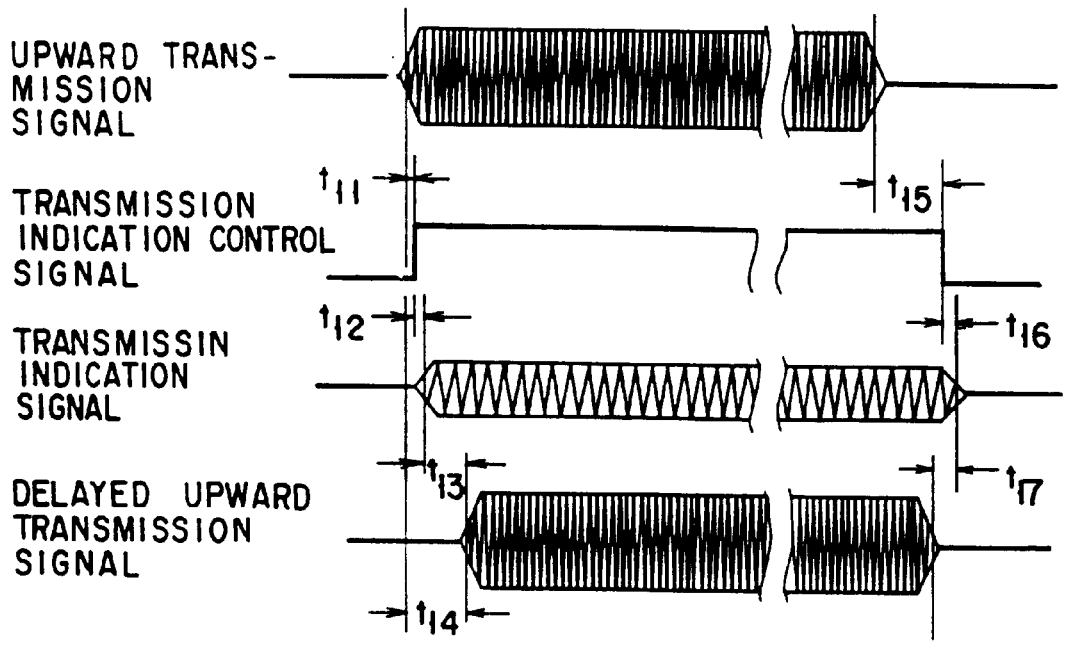
FIG. 8
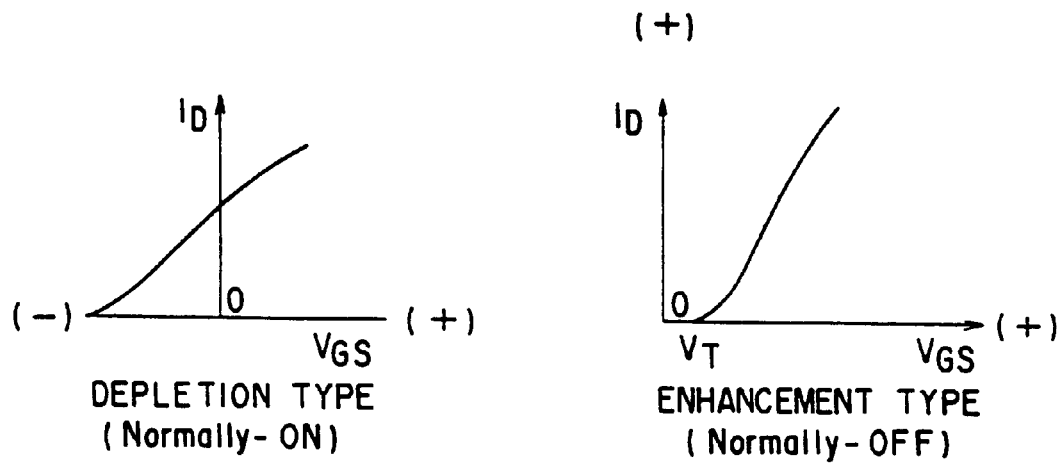
FIG. 11A
FIG. 11B

DEGREE OF SUPRESSION OF INGRESS NOISE BY COMBINATION OF HFC ARCHITECTURE AND GSU

| UPWARD OPERATION UNIT | | NARROWBAND COHERENT NOISE | BROADBAND INCOHERENT NOISE | SPECIFIC SUBSCRIBER NOISE |
|---|---|---|---|---|
| 5 SUBSYSTEMS | HFC | −18 dB | −13 dB | 0 dB |
| | GSU | −28 dB | −20 dB | −40 dB |
| | TOTAL | −46 dB | −33 dB | −40 dB |
| 2 SUBSYSTEMS | HFC | −24 dB | −17 dB | 0 dB |
| | GSU | −28 dB | −20 dB | −40 dB |
| | TOTAL | −52 dB | −37 dB | −40 dB |
| 1 SUBSYSTEMS | HFC | −28 dB | −20 dB | 0 dB |
| | GSU | −28 dB | −20 dB | −40 dB |
| | TOTAL | −56 dB | −40 dB | −40 dB |

FIG. 9

FROM TRANSMISSION DISPLAY
SIGNAL DETECTION CIRCUIT

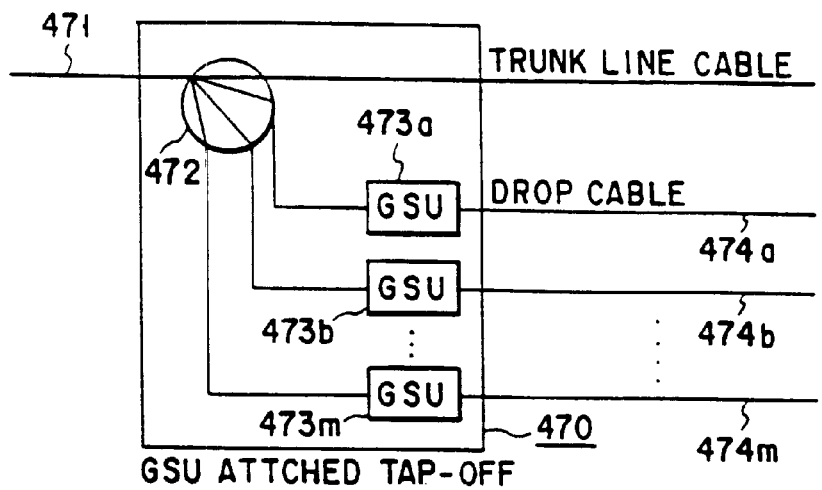
F I G. 21
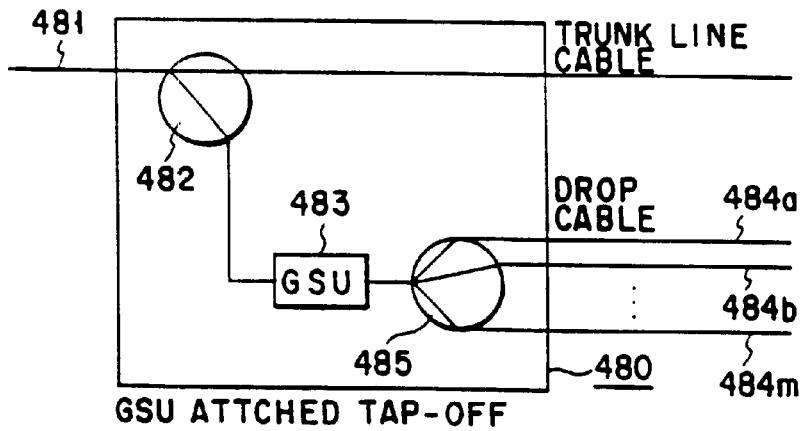
F I G. 22
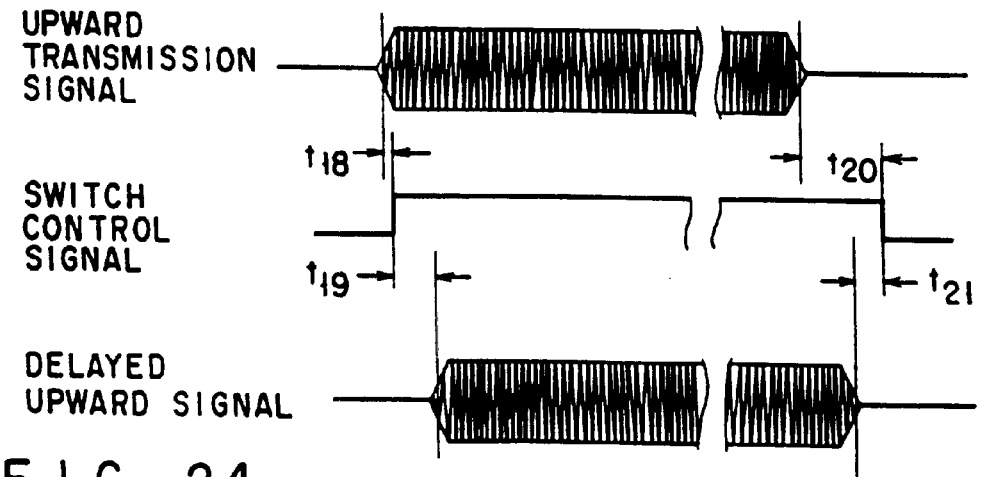
F I G. 24

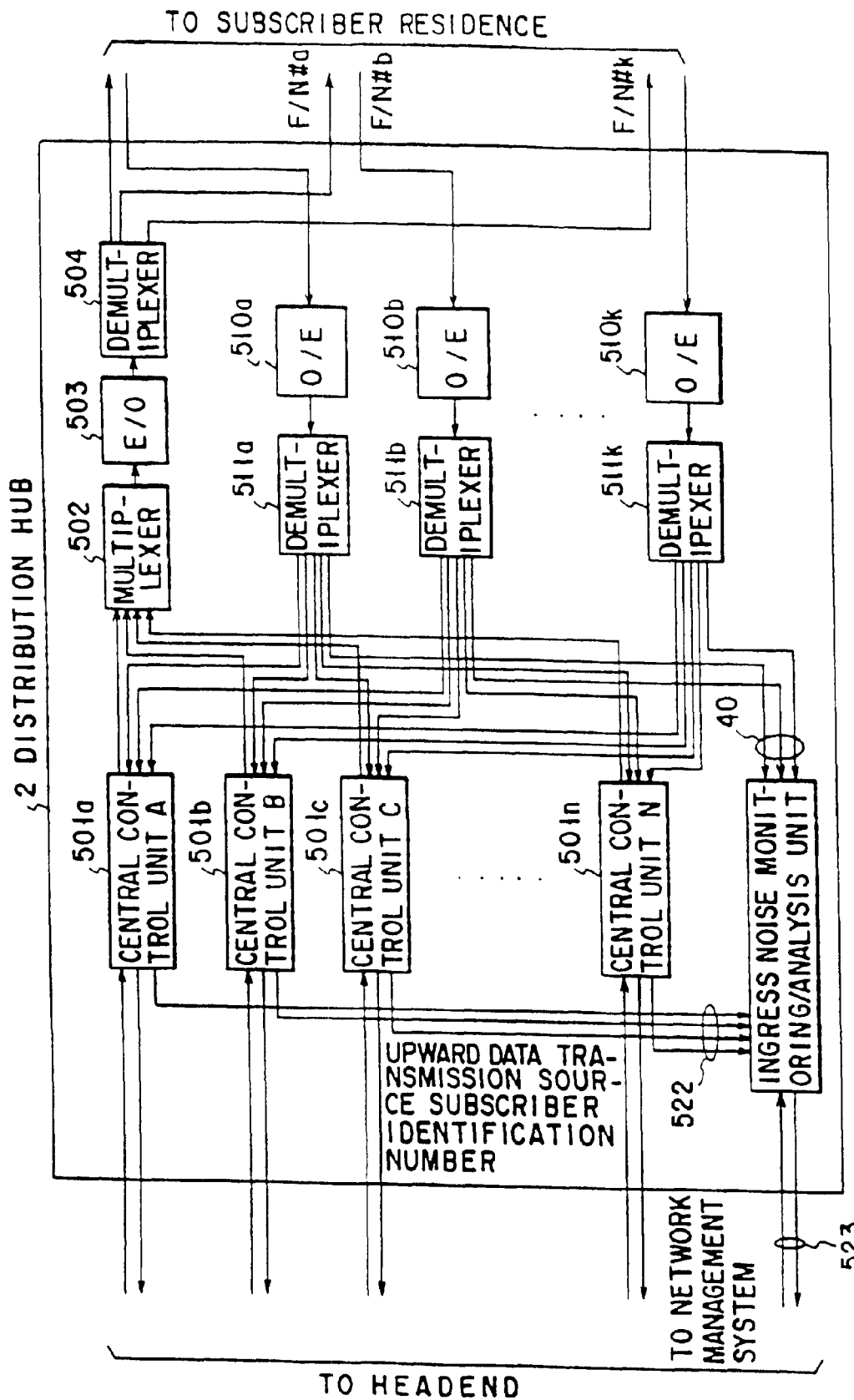
F I G. 25

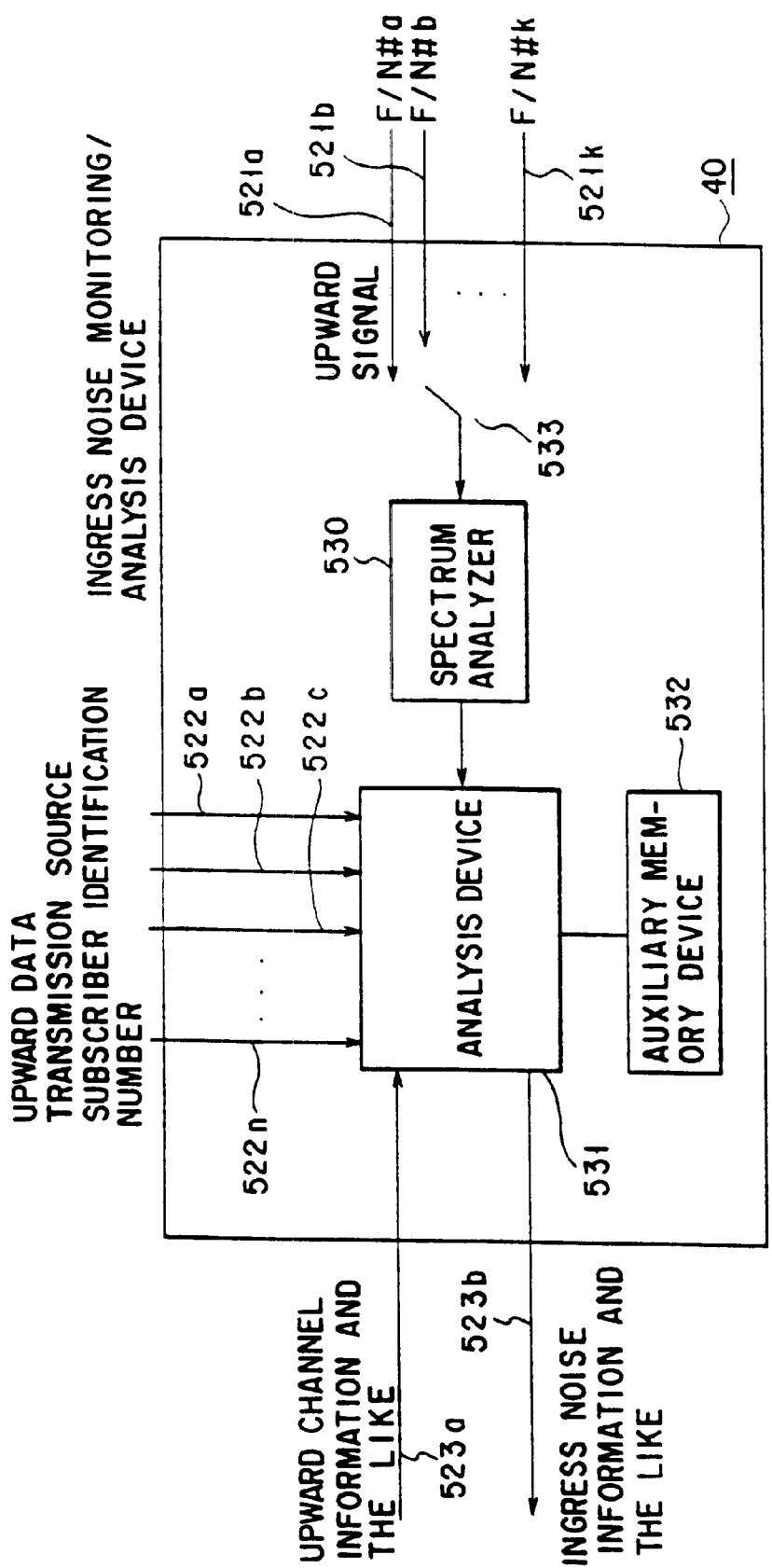
F I G. 26

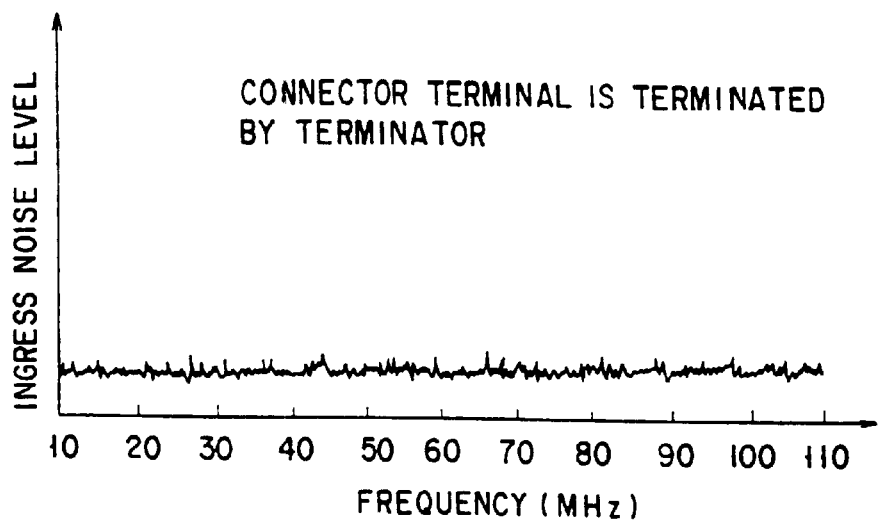
F I G. 29
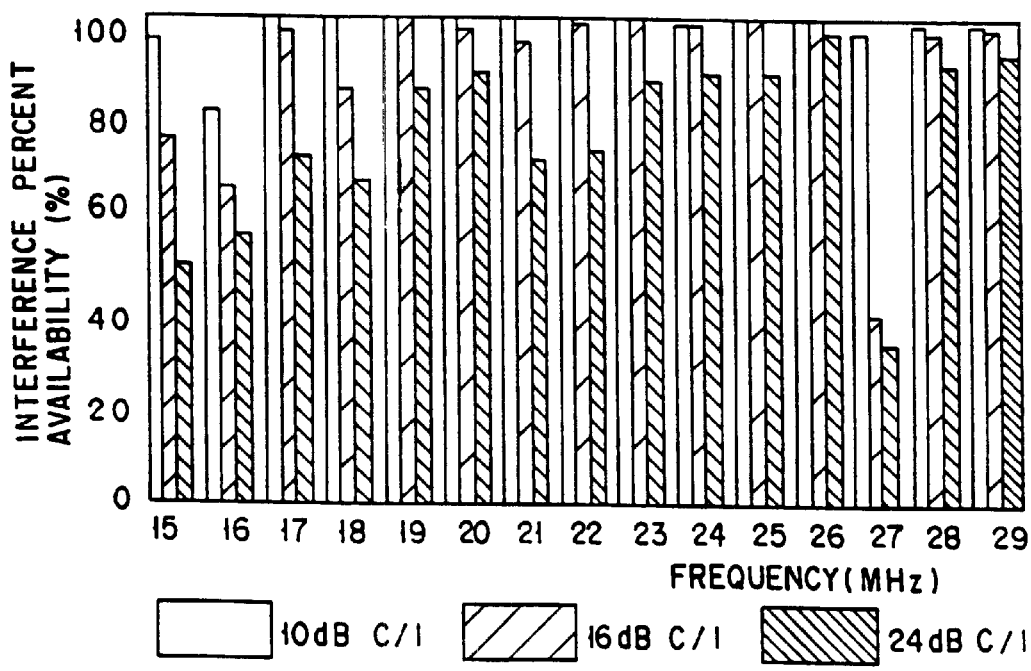
F I G. 30

DEGREE OF SUPRESSION OF INGRESS
NOISE BY HFC ARCHITECTURE
| UPWAD OPERATION UNIT | NARROWBAND COHERENT NOISE | BROADBAND INCOHERENT NOISE |
|---|---|---|
| 5 SUBSYSTEMS | -18 dB | -13 dB |
| 2 SUBSYSTEMS | -24 dB | -17 dB |
| 1 SUBSYSTEMS | -28 dB | -20 dB |
F I G. 34
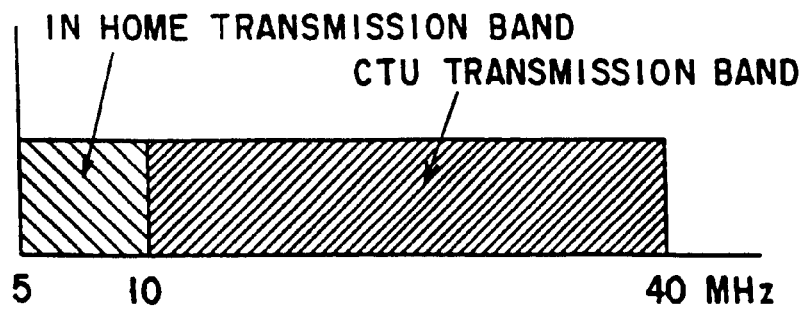
F I G. 35

CABLE NETWORK SYSTEM WITH INGRESS NOISE SUPPRESSING FUNCTION

This application is a continuation of application Ser. No. 09/417,017 filed on Oct. 12, 1999, now allowed, U.S. Pat. No. 6,160,990, which is a continuation of application Ser. No. 08/717,296, filed Sep. 20, 1999, abandoned.

BACKGROUND OF THE INVENTION

1. Field of the Invention

The present invention relates to a cable network system constituted in a tree or star shape like, e.g., a bidirectional CATV (Cable Access TeleVision) system and an HFC (Hybrid Fiber and Coaxial) system and, more particularly to, a cable network system having a function of suppressing ingress noise in an upward transmission path.

2. Description of the Related Art

In recent years, a trend of changing CATV systems providing mainly video broadcast services into bidirectional systems and developing various bidirectional transmission services has been activated. The bidirectional transmission services include on-line services (to be referred to as PC on-line services hereinafter) for data terminals such as personal computers, real-time communications services for telephones, videophones, and the like, and VOD (Video On Demand) services for rapidly providing desired movie video and the like to users, as needed.

When the bidirectional services are to be realized in a cable network system having a transmission path branched in a tree or star shape, like the CATV system, measures against ingress noise are required.

More specifically, if there is a connector open terminal to which, e.g., no in-home device is connected in each subscriber residence, or if a used coaxial cable is insufficient in electromagnetic shielding characteristics though the in-home device is connected, interference radio waves such as shortwave broadcasts, and electromagnetic wave noise from electrical motors, such as a vacuum cleaner, or motorcycles flow in via the connector open terminal or the coaxial cable. FIGS. 27 and 28 show examples of data obtained by experiments on inflow noise. FIG. 27 shows the spectrum distribution of noise flowing from the connector open terminal. The inflow noise was observed in a band of 40 MHz or less. FIG. 28 shows the spectrum distribution of inflow noise in a state wherein a 5-cm lead line is connected to a connector terminal, on the assumption that a used coaxial cable is insufficient in electromagnetic shielding characteristics. More typical inflow noise was observed in the band of 40 MHz or less. In addition, FIG. 29 shows actual data obtained when a connector terminal was terminated by a terminator. In this case, inflow noise was not substantially detected.

If noise flows into respective subscriber residences in this manner, lots of noise merge on an upward transmission path to increase the level and be transmitted to a headend. This noise is generally called ingress noise. The ingress noise causes degradation of the transmission quality, and in some cases causes the system to fail in transmission.

FIG. 30 shows an example of the interference percent availability of ingress noise actually observed over several days in a bidirectional cable network having 1500 subscribers. As is apparent from FIG. 30, the availability of satisfying the C/I (Carrier to Interference) ratio of 10 dB per 1-MHz channel bandwidth was almost 100%. The availability of satisfying the C/I ratio of 24 dB as a high-quality transmission environment was 70 to 80% on average and was below 50% depending on the band. It was found from remaining observation results that the interference percent availability became lower as the channel bandwidth was narrower and the number of subscribers was-smaller.

The ingress noise can be roughly classified into three types: narrow and coherent noise, broadband incoherent noise, and specific subscriber noise.

The narrowband coherent noise is electromagnetic waves having large transmission power, such as shortwave broadcast waves and military radio waves present in an upward frequency band (5 to 48 MHz in Japan, and 5 to 40 MHz in the United States). Although the bands are narrow, these electromagnetic waves flow from the connector open terminals and the like of almost all subscribers. If all signals which reach a headend are in phase, the noise level observed at the headend equivalently increases by 20 logs [dB] for the average inflow noise per subscriber where S is the number of accommodated subscribers. In fact, however, the noise level increases by about 14 logs [dB] because signals have a difference in propagation delay time therebetween.

The broadband incoherent noise is generated by strong electromagnetic waves radiated in the atmosphere from the sparks of an electrical motor and a gasoline engine, and discharge tubes and digital devices such as a personal computer. Although the frequency band is broad (2 kHz to 100 MHz), the noise level decreases by 1/f as a frequency f becomes higher. Noise flowing into the upward transmission path is not correlated with other noise (incoherent). The noise can be considered as Gaussian noise. For this reason, the noise level equivalently increases at the headend by 10 logs [dB] for the average inflow noise per subscriber.

The specific subscriber noise is generated when a subscriber erroneously connects an amateur radio device or a digital device such as a personal computer to a cable, or when the subscriber intentionally sends an interference signal to the cable. Since this noise directly flows into the upward transmission path, the noise level may be kept high over a long time.

In addition to the above-described three types of noise, there is harmonic noise caused by signal distortion on the transmission path. The harmonic noise is caused by a nonlinear effect generated by corrosion of a fitting connector terminal on a trunk line cable. This noise can be prevented by proper maintenance and management of cable industrial companies.

Inflow portions of the ingress noise can be classified into two portions: a portion on a trunk system and a portion inside a subscriber residence. The trunk system generally uses a coaxial cable excellent in electromagnetic shielding characteristics. The ingress noise may flow from a loose connector or an old or worn cable. However, such inflow of noise can be prevented by proper maintenance and management of cable network system industrial companies. To the contrary, no measure is provided with respect to the noise flowing from the subscriber residence. The bidirectional services must be performed in consideration of this noise.

FIG. 31 shows a comparison of the spectrum distribution of ingress noise observed on an upward transmission and the assumed level of an upward data signal. Strong noise estimated to be narrowband coherent noise was observed around 6.5 MHz, 10 MHz, and 27 MHz, and noise estimated to be broadband incoherent noise was observed at remaining frequencies. It is supposed that a very-high-quality transmission path can be realized if both the narrowband coherent noise and the broadband incoherent noise are suppressed by more than 20 dB. However, this suppression cannot be achieved, so that the various measures are proposed as follows.

(a) HFC (Hybrid Fiber and Coaxial) Architecture

The HFC architecture aims at a reduction in ingress noise level by decreasing the number S of subscribers described above. The conventional CATV system broadcasts television video from a headend to several ten thousands of subscribers via only coaxial cables by using several tens of bidirectional trunk amplifiers. This CATV system is subdivided into a maximum of 500 home paths per subsystem by combining, e.g., optical fibers and coaxial cables, as shown in FIG. 32. Note that the home paths represent the number of homes to which cables are wired near the residences or under the eaves and services are immediately provided if the subscribers require them. The actual number of subscribers for the services is 60% on average in the United States, i.e., 300 subscribers per subsystem.

Referring to FIG. 32, a reception equipment for receiving television broadcasts sent via communication satellites, and an information transmission equipment for providing various bidirectional services, such as servers, routers, and switching units are installed in a headend (H/E) 1. A plurality of distribution hubs (D,Hs) 2, . . . are connected to the H/E 1 via exclusive optical fibers 3, . . . in a star shape. In the D/Hs 2, . . . , television broadcast signals and downward signals for various bidirectional services which are sent from the H/E 1 are modulated and then synthesized with each other. Thereafter, obtained signals are converted into optical signals and transmitted to fiber nodes (F/Ns) 5, . . . via optical fibers 4.

The FINs 5, . . . convert the optical signals sent from the D/Hs 2 into electrical signals, and transmit them to subsystems 20 each having 500 home paths. In each subsystem 20, trunk line coaxial cables 6 (to be referred to as trunk line cables hereinafter) are connected around the F/N 5 in a tree or star shape. Tap-offs 8 are arranged on these trunk line cables 6 to branch the trunk line cables 6 into drop coaxial cables 9 (to be referred to as drop cables hereinafter). The drop cables 9, . . . are dropped in subscriber residences 10.

In the subscriber residences 10, as shown in FIG. 33, a television receiver 11 can be directly connected to an in-home splitter 18 to receive television broadcasts, and a television receiver 13 can be connected to the in-home splitter 18 via a set-top box (STB) 12 to receive the VOD services. In addition, a personal computer 14, a videophone 15, or a telephone 16 is connected via a modem to receive the PC on-line services and the real-time communications services. Bidirectional trunk amplifiers 7 for compensating the attenuation of signals are arranged at a plurality of portions on the trunk line cables 6, . . . .

While the VOD services and the PC on-line services are received, upward signals transmitted from the STB and the modem are sent to the F/N 5 via the drop cables 9, the tap-offs 8, and the trunk line cables 6. The signals are converted into optical signals by the F/N 5, and the optical signals are sent to the D/H 2 via the optical fiber 4. The sent signals are converted into electrical signals by the D/H 2 and then demodulated. The resultant signals are sent to the H/E 1 and processed. Upward and downward signals are transmitted on the bidirectional transmission path using the trunk line cables 6 and the drop cables 9 in such a manner that they pass through different frequency bands.

In general, the cable network system using the HFC architecture has a service area of a maximum of about 50 km per headend. This cable network system can accommodate a maximum of 300,000 home paths. The distribution hubs are arranged at a maximum of about 15 portions. Therefore, one distribution hub deals with a maximum of 20,000 home paths. A maximum of 40 subsystems are connected to the distribution hub. However, since downward signals include analog video signals, a very expensive laser diode having high linearity is required to convert electrical signals into optical signals. For this reason, in many cases, identical signals are transmitted in the downward direction to five subsystems as a unit, i.e., to every 2,500 home paths (the average number of subscribers: 1,500).

To the contrary, upward signals are basically operated for each subsystem because of ingress noise suppression. However, to reduce the cost of a demodulator for an upward signal set in the distribution hub, the upward signals must be operated for 2 or more subsystems as a unit in fact.

FIG. 34 shows the degree of improvement by the HFC architecture when the operation unit in a conventional system not using the HFC architecture is set to 50,000 home paths. From FIG. 34, it was found that the HFC architecture was an effective method to reduce the ingress noise. However, as is apparent from the observation result (observation in 5 subsystems) in FIG. 30, the influence of the ingress noise is still large even with the HFC architecture in terms of the transmission quality. For this reason, parallel use of the following various measures has conventionally been examined.

(b) Frequency Agility

The frequency agility is a method of switching a specific frequency band to another frequency band when the transmission quality is degraded in the specific frequency band. This method is effective for avoiding the influence of a strong interference wave caused by the narrowband coherent noise or the specific subscriber noise. However, this method cannot provide an essential solution such as the reduction of the ingress noise itself.

(c) Low-Efficiency Modulation Scheme

The signal-to-noise ratio is low on the upward transmission path where the ingress noise is present. For this reason, it is difficult to employ a high-efficiency modulation scheme such as QAM in which signals are symbolized and modulated in units of 4 or 6 bits. In fact, a modulation scheme such as QPSK is employed at most.

(d) Error Correction/Retransmission

Error correction/retransmission is a method of estimating and correcting an error portion when received data have a bit error due to the ingress noise or the like, and if the error portion cannot be completely corrected, requiring retransmission to a transmission source by a communication protocol such as a TCP/IP (Transmission Control Protocol/Internet Protocol). However, this method cannot provide an essential solution for the ingress noise, either. In addition, the transmission efficiency decreases due to an error correction code added to actual data or retransmission.

(e) Band Reduction+Frequency Division Multiplex

Band Reduction+frequency division multiplex are a measure which pays attention to a reduction in influence of the ingress noise by narrowing the channel bandwidth, as described above, and tries to effectively use frequency bands as much as possible by using bands free from interference waves generated by, e.g. the narrowband coherent noise or the specific subscriber noise. It is designed to ensure a desired transmission capacity by determining a band for each channel and increasing the number of frequency carriers, i.e., by applying a frequency division multiplex scheme. However, this measure cannot provide an essential solution for the ingress noise, either, similar to the above-described schemes.

(f) Bridger Switch

Bridger switches are arranged in units of trunk line cables branched from, e.g., a fiber node. When strong ingress noise is observed, the bridger switches are sequentially turned off to specify a trunk line cable to which the generation source of the noise is connected, and to cut the trunk line cable from the system. This scheme is effective for the specific subscriber noise. However, services for all subscribers connected to the cut trunk line cable are stopped. In addition, human-wave tactics must be employed to search the subscriber as the generation source on the specified trunk line cable. This may lead to a serious problem when the bidirectional services get into stride in the future, and when the bridge switches must be often operated due to the carelessness of subscribers.

(g) High-pass Filter

According to a method using high-pass filters, when the HFC architecture is realized, high-pass filters which pass only signals in a downward transmission band therethrough and cut off signals in an upward transmission band are attached to all subscriber residences except for the residences of subscribers who desire the bidirectional services. With this arrangement, only the subscribers who desire the bidirectional services can use the upward transmission band. This method is effective when the number of subscribers who desire the bidirectional services is small. However, as the number of subscribers who desire the bidirectional services increases, the inflow amount of the ingress noise increases. If the subscribers who desire the bidirectional services are 1% of all the subscribers, the inflow in amount can be effectively reduced by 20 to 28 dB; . . . f 20%, it is reduced by only 3 to 4 dB.

(h) CTU Scheme

In the CTU (Coaxial Termination Unit) scheme, services are divided on the frequency band into services requiring a broadband for transmission in the upward direction, such as the PC on-line services and the real-time communications services, and services capable of using a narrow upward transmission band, such as the VOD services. As for the former, as shown in FIG. 33, a CTU 17 is arranged at a position before a subscriber residence to terminate a cable, thereby preventing the inflow of noise. In an actually proposed scheme, a frequency band of 10 to 40 MHz is assigned to the former, and a band of 5 to 10 MHz is assigned to the latter, as shown in FIG. 35. The CTU 17 incorporates a modem function for the PC on-line services and the real-time communications services. The filter characteristics and the like are designed not to flow noise to the band of 10 to 40 MHz from a subscriber residence.

As for the latter, the cable is directly connected to an STB or a television receiver via an in-home splitter arranged in the subscriber residence. For this reason, noise flows into the band of 5 to 10 MHz from all subscribers. However, since the transmission rate is low, and the transmission band is narrow, the influence of the ingress noise is relatively weak.

In general, the expensive CTU 17 cannot be set for a subscriber who does not desire the bidirectional services. For this reason, in the CTU scheme, even if the CTUs 17 are set for 20% of the subscribers, the ingress noise is reduced by only about 1 dB. For this reason, a remarkable effect cannot be expected until the installation ratio of the CTU 17 increases to about 100%.

Further, a scheme using the CTU 17 in combination with the high-pass filter can be considered. That is, the high-pass filter is attached for a subscriber who does not desire the bidirectional services, and the CTU is set for a subscriber who desires the bidirectional services, instead of the high-pass filter. According to this scheme, the ingress noise does not flow in the band of 10 to 40 MHz. In fact, however, the CTU scheme is not practically used because of the following various problems.

More specifically, the first point is how to supply power to the CTU when the CTU is attached outside a residence, e.g., under the eaves. In telephone services using the cable system (to be described later), power is supplied to a telephone modem at an AC voltage of about 100 V via a drop cable due to the necessity of the supply of power to a telephone. It is not economical or practical to supply power looking via the coaxial cable ahead to the PC on-line services requiring higher speed operations and new services to be provided in the future, in addition to the telephone services. Therefore, power must be supplied from a commercial AC power supply to the CTU. However, a work for a new power supply of the CTU set outside the residence is undesirable because it complicates the work and results in an increase in work cost.

The second point is how to perform an in-home wiring work for each service. One of the features of the bidirectional cable system is to use a shared medium, i.e., a single transmission medium for various purposes and application purposes. To perform the in-home work for each new service is to increase an economical burden on a subscriber, interrupting invitations to the new services.

The influence of the ingress noise on the upward transmission path and the prior art described above are described in detail in the following references:

[1] Cable Labs, "Two-Way Cable Television System Characterization, Final Report", Apr. 12, 1995.

[2] C.A. Eldering, et al., "CATV Return Path Characterization for Reliable Communications", IEEE Communication Magazine, pp. 62–69, August 1995.

As described above, various measures have been proposed. Some of these measures are accompanied by enormous investment, like the HFC architecture. Even if these measures are performed, the ingress noise cannot be essentially removed. If there is provided a low-cost and practical solution to sufficiently suppress the ingress noise, a great effect will be attained.

SUMMARY OF THE INVENTION

It is an object of the present invention to effectively suppress upward ingress noise by a low-cost and practical means, thereby allowing the transmission of an upward signal under a high-quality transmission environment.

To achieve the above object, in a cable network system of the present invention, a transmission path opening/closing device is set in a bidirectional transmission path. The transmission path opening/closing device sets an upward transmission path of the bidirectional transmission path in a conductive state during the pass period of an upward signal transmitted from a subscriber device, and sets the upward transmission path in a cutoff state during the remaining period.

According to the present invention, the upward transmission path is kept in the cutoff state by the transmission path opening/closing device while the subscriber device transmits no upward signal. For this reason, even if noise flows into the upward transmission path due to an open connector terminal in a subscriber residence or a used coaxial cable insufficient in electromagnetic shielding characteristics, the inflow noise is cut off by the transmission path opening/closing device not to flow out to the upstream side of the bidirectional transmission path. Therefore, the ingress noise level on the bidirectional transmission path is suppressed low. Bidirectional transmission can be performed under a high-quality transmission environment.

Note that the subscriber device represents a modem, an STB, and the like for performing bidirectional communication with a central equipment or signal transmission in only the upward direction. The subscriber devices are classified as devices used inside subscriber residences and devices used outside the residences, e.g., in a campus.

As the arrangement of the transmission path opening/closing device, the following can be considered. That is, a switch control section and a gate switch section are separately prepared. The switch control section is incorporated in or added to an in-home device of a subscriber. The gate switch section is arranged on the bidirectional transmission path outside the subscriber residence. When the switch control section detects the transmission period of the upward signal from the subscriber device or receives the notification of the transmission period, the switch control section generates a transmission indication signal representing the transmission period and transmits it to the bidirectional transmission path. The gate switch section opens/closes the upward transmission path of the bidirectional transmission path in accordance with the transmission indication signal sent from the switch control section.

With this arrangement, the gate switch section arranged on the bidirectional transmission path outside the subscriber residence can be reduced in size and cost.

As another arrangement of the transmission path opening/closing device, the following can be considered. That is, the switch control section for generating the transmission indication signal, and the gate switch section for opening/closing the upward transmission path of the bidirectional transmission path are accommodated in a common housing. This housing is interposed and set in the bidirectional transmission path.

With this arrangement, an additional device incorporating the switch control section is not prepared in the subscriber residence, and the switch section need not be added to an existing device in the subscriber residence. Therefore, a load on the subscriber can be reduced. In addition, the transmission indication signal generated by the switch control section need not be notified to the gate switch section via the bidirectional transmission path. For this reason, the transmission indication signal can be accurately notified without being affected by noise and the like on the bidirectional transmission path. Therefore, the operation reliability of transmission path open/close control can be kept high.

As for the installation location of the transmission path opening/closing device or the gate switch section on the bidirectional transmission path, it may be incorporated in either an in-home splitter or a connection unit for connecting the out-of-home and in-home transmission paths of the bidirectional transmission path. Note that the connection unit includes a surge suppresser set outside the residence, a unit set to guide an underground cable to the ground, and the like.

The transmission path opening/closing device or the gate switch section may be installed in a tap-off on the bidirectional transmission path. By installing the transmission path opening/closing device or the gate switch section in the tap-off, a subscriber cannot remove or remodel the transmission path opening/closing device or the gate switch section.

When the transmission path opening/closing device and the gate switch section is to be installed in the tap-off, they may be separately arranged for a plurality of local lines or commonly arranged for the plurality of local lines. When the transmission path opening/closing device or the gate switch section is arranged for each local line, the influence of noise on the transmission path opening/closing device or the gate switch section can be reduced thereby keeping the operation reliability high. To the contrary, when the transmission path opening/closing device and the gate switch section is commonly arranged for the plurality of local lines, the influence of the ingress noise from each subscriber increases. However, since only one transmission path opening/closing device is provided to a plurality of subscribers, the installation number of transmission path opening/closing devices can be advantageously decreased.

The transmission indication signal is sent upon modification in accordance with a random data sequence as a notification means for the transmission indication signal. Even if a plurality of transmission indication signals collide with each other to cause interference, the degree can be suppressed to reduce the malfunction of the gate switch section.

As the notification means for the transmission indication means, a spread spectrum scheme and a CDMA scheme using this scheme may be applied. With these schemes, the transmission indication signal has a high resistance to noise and the like, and can also be protected from an interference signal. At this time, high security can be ensured by managing a spread code sequence as an encryption key or a secret key.

The transmission indication signals are sent from the switch control section by using a plurality of carriers. The transmission indication signals sent by using the plurality of carriers are received and reproduced by the gate switch section. Only when all the transmission indication signals with the plurality of carriers are reproduced, the upward transmission path of the bidirectional transmission path may be set in the conductive state.

At that time, the transmission indication signals undergo signal processing using preset parameters and are sent by using the plurality of carriers. The gate switch section checks whether the received and reproduced transmission indication signals with the plurality of carriers have undergone the signal processing using the parameters. If NO, the upward transmission path of the bidirectional transmission path may be restored to the cutoff state. With this operation, when an interference signal is sent due to noise, an intentional mischief, and the like, the resistance to them can be further enhanced.

Further, a signal delay means is prepared. This signal delay means is for delaying the upward signal by a time required for the gate switch section to set the upward transmission path in the conductive state in accordance with the transmission indication signal after the subscriber device starts to transmit the upward signal. The signal delay means is arranged at least one of the switch control section and the gate switch section. With this arrangement, the conduction timing in the gate switch section can be accurately synchronized with the pass timing of the upward signal. Noise can be effectively prevented from flowing into the upward transmission path, and the upward signal can be passed reliably.

As the arrangement of the signal delay means, the following can be considered. That is, in the first arrangement, the frequency of the upward signal is converted to a higher frequency. Then, the upward signal is delayed by a required time via a delay element. The frequency of the aelayed upward signal is returned to the original frequency. With this arrangement, the required delay amount can be obtained by one delay element. In the second arrangement, a plurality of delay elements having different pass bands are prepared. Upward signals are delayed in accordance with their bands by combining these delay elements. With this arrangement, the required delay amount can also be reliably obtained for the broadband upward signals.

Power required for the operation of the gate switch section may be obtained from the transmission indication signal output from at least one of the switch control section and the subscriber device, from DC or AC power, or a signal sent via a trunk line or a local line. A work related to the power supply such as wiring of another supply line for the power supply can be eliminated.

The switch control section may be incorporated in the subscriber device. The switch control section detects the transmission period of the upward signal from an in-home device main body, or sends the transmission indication signal representing the transmission period upon reception of the notification of the transmission period, thereby controlling the ON/OFF operation of the gate switch section. With this arrangement, a new subscriber need not separately purchase or install a subscriber device and a switch control section.

An adaptor device accommodating the switch control section may be prepared, added to the subscriber device, and used. With this arrangement, a new subscriber device having a switch control function need not be prepared. The effect of the present invention can be obtained by only adding the adaptor device to the existing subscriber device.

According to another aspect of the present invention, a transmission path opening/closing device is arranged in a bidirectional transmission path in a cable network system for performing bidirectional transmission between a central equipment and a subscriber devices via the bidirectional transmission path constituted in a tree or star shape. At the same time, an ingress noise monitoring/analysis device is arranged between the transmission path opening/closing device on the bidirectional transmission path and the central equipment. Noise on an upward transmission path which has passed through the transmission path opening/closing device is monitored in the ingress noise monitoring/analysis device. The degree of influence of the noise on the transmission quality of the upward transmission path is determined on the basis of the monitoring data. At the same time, the subscriber of the originating source is estimated on the basis of originating source information included in the upward signal sent together with the noise. The determination result and the estimation result are notified to the central equipment.

According to this aspect of the invention, if the ingress noise is not cut off by the transmission path opening/closing device and flows out to the upstream side of the bidirectional transmission path, the degree of influence is determined by the ingress noise monitoring/analysis device. At the same time, the subscriber of the originating source is estimated. The determination data and the estimation data are notified to a network management system installed in the central equipment to require system maintenance/ operation personnel to make an investigation and take a required action. Therefore, even if a subscriber erroneously directly connects, e.g., a personal computer to the transmission path, the erroneous state can be quickly canceled without being left unchanged for a long time.

In the ingress noise monitoring/analysis device, a noise monitoring means is constituted by a plurality of filters having bandwidths equivalent to measurement resolutions. Frequency bands as monitoring targets are simultaneously monitored by these filters. With this arrangement, intermittent noise which disappears in a very short time can be detected reliably.

When the bidirectional transmission path as a monitoring target is branched into a plurality of branch transmission paths, the noise monitoring means of the ingress noise monitoring/analysis device sequentially monitors noise on each of the plurality of branch transmission paths for a predetermined time. If a branch transmission path of these branch transmission paths on which the degree of influence of the noise exceeds a predetermined level is found, the branch transmission path is monitored more intensively than the remaining branch transmission paths. With this operation, the branch transmission path on which the degree of influence of the ingress noise is increasing can be intensively monitored, so that a proper measure can be executed in an early stage.

According to still another aspect of the present invention, the transmission path opening/closing device is set in the transmission path of a one-way transmission system for only transmitting a signal from a subscriber device to a central equipment. The transmission path opening/closing device sets the upward transmission path of the transmission path in the conductive state during the pass period of a signal transmitted from the subscriber device, and sets the upward transmission path in the cutoff state during the remaining period.

According to this aspect of the present invention, the influence of the ingress noise can be reduced not only in the bidirectional transmission system but also in a transmission system in which data obtained by the inspection of a meter which represent the use amount of power, gas, water supply, or the like by a subscriber are periodically transmitted to a central equipment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the arrangement of a gate switch unit (GSU) provided to the system shown in FIG. 1;

FIG. 3 is a chart showing the filter characteristics of frequency separation circuits 103 and 105 provided to the GSU shown in FIG. 2;

FIG. 4 is a timing chart used to explain the operation of the GSU shown in FIG. 2;

FIG. 8 is a timing chart used to explain the operation of the NGA shown in FIG. 7;

FIG. 9 is a table showing ingress noise inhibiting effects obtained by combining an HFC architecture and the GSU;

FIG. 11A is graph showing the characteristics of gallium arsenide field effect transistor of depletion type;

FIG. 11B is graph showing the characteristics of gallium arsenide field effect transistor of enhancement type;

FIG. 21 is a block diagram showing an arrangement of a GSU attached tap-off according to the second embodiment of the present invention;

FIG. 22 is a block diagram showing another arrangement of the GSU attached tap-off according to the second embodiment of the present invention;

FIG. 24 is a timing chart used to explain the operation of the S-GSU shown in FIG. 23;

FIG. 25 is a block diagram showing the arrangement of a distribution hub 2 provided with an ingress noise monitoring/analysis device 40 according to the fourth embodiment of the present invention;

FIG. 26 is a block diagram showing the arrangement of the ingress noise monitoring/analysis device shown in FIG. 25;

FIG. 29 is a graph showing the spectrum distribution of inflow noise in a state in which the connector terminal is terminated;

FIG. 30 is a graph showing an example of an interference percent availability caused by ingress noise in a bidirectional cable network system;

FIG. 34 is a table showing an example of the degree of suppression of ingress noise caused by the HFC architecture; and FIG. 35 is a graph showing an example of band division characteristics used to explain a CTU scheme.

DETAILED DESCRIPTION OF THE PREFERRED EMBODIMENTS

First Embodiment

Figure 1:
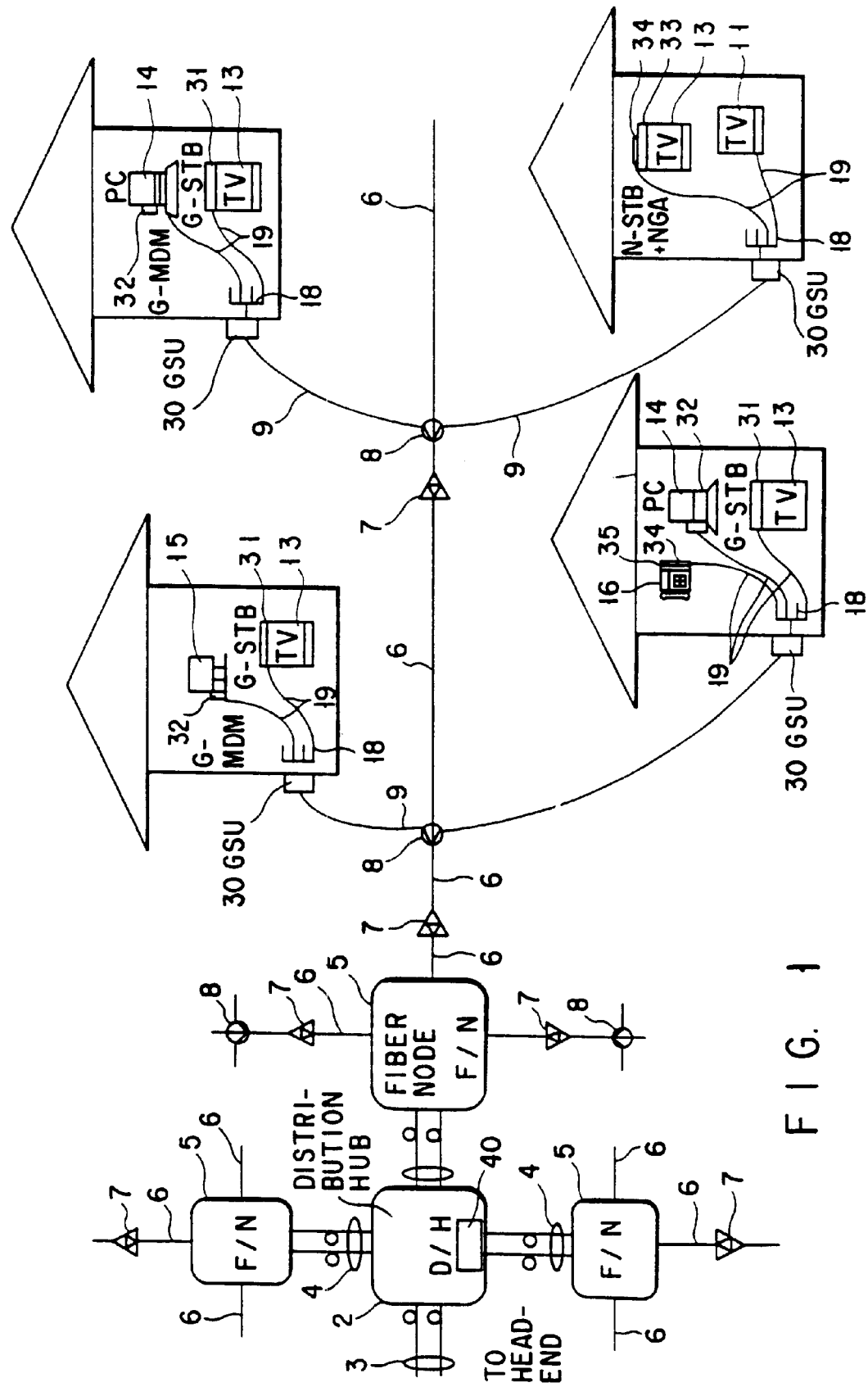
FIG. 1 is a block diagram showing a cable network system according to the first and fourth embodiments of the present invention.
Figure 32:
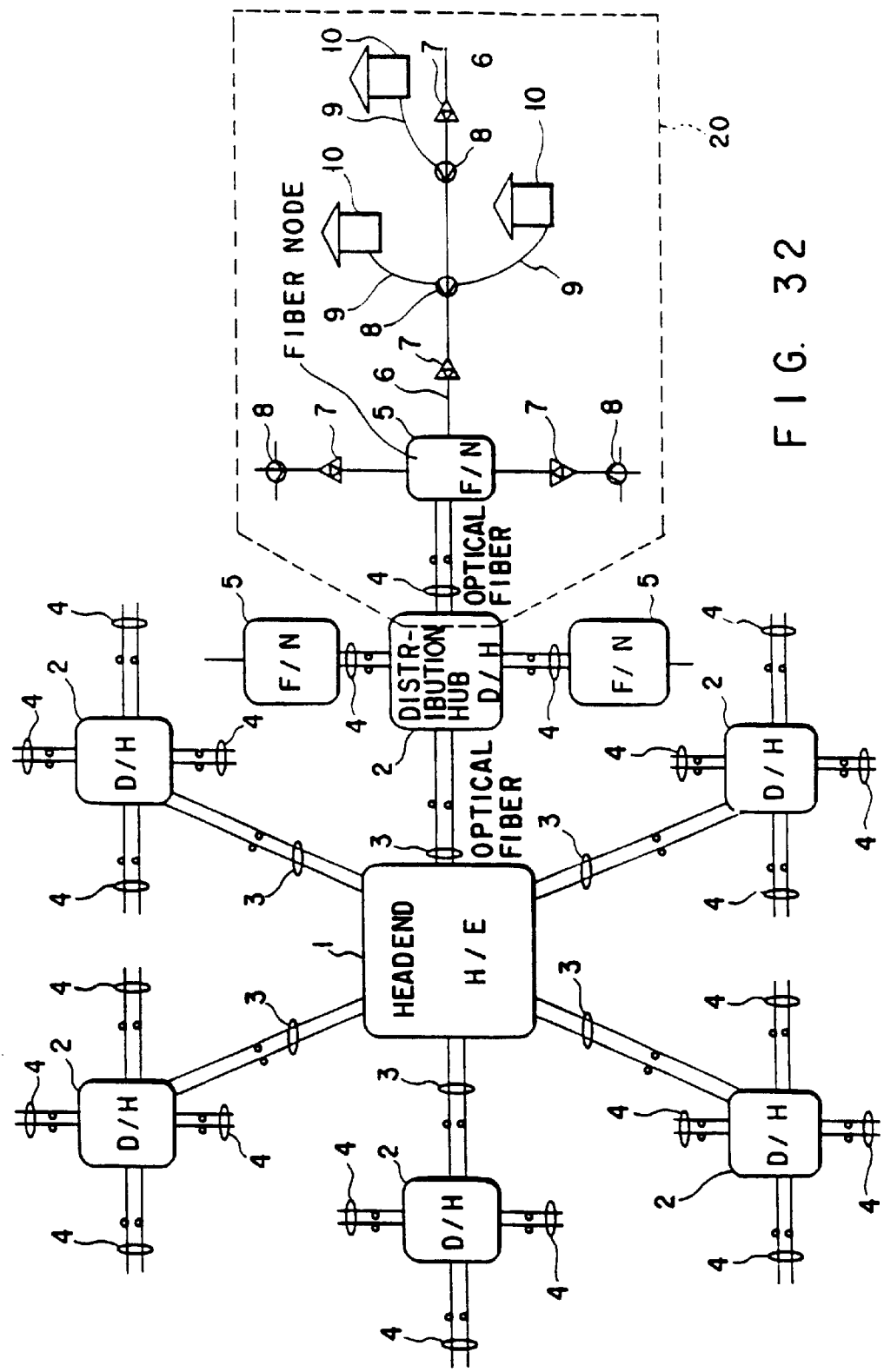
FIG. 32 is a view showing an arrangement of the cable network system using the HFC architecture.
Figure 33:
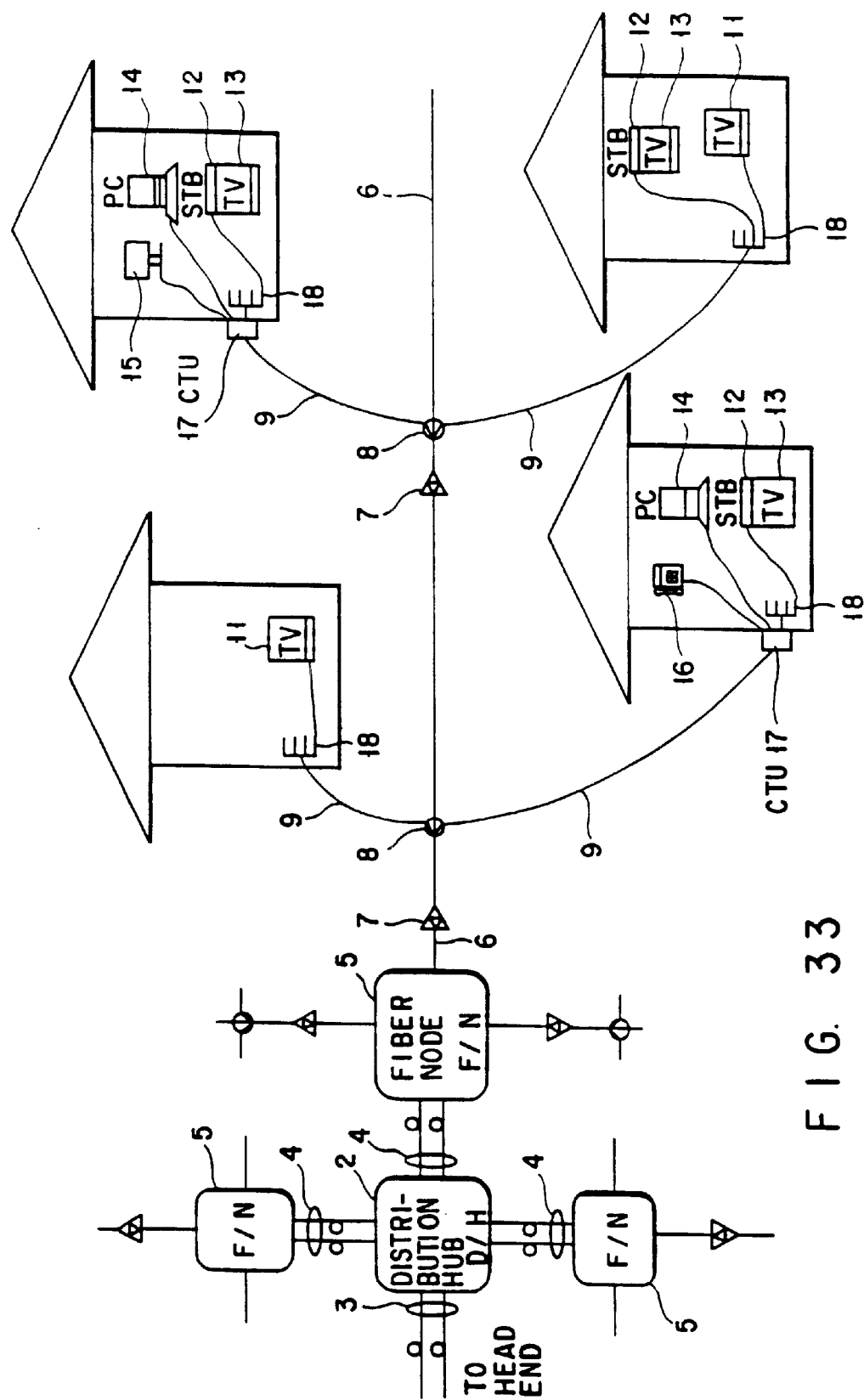
FIG. 33 is a view showing an arrangement of a subsystem in the system shown in FIG. 32.

FIG. 1 is a block diagram showing a cable network system according to the first embodiment of the present invention. The same reference numerals as in FIG. 32 denote the same parts in FIG. 1 to describe the first embodiment.

In the system of this embodiment, a gate switch unit (GSU) 30 is set below, e.g., the eaves of each subscriber residence. A drop cable 9 is connected to an in-home splitter 18 via the GSU 30. An in-home device desired by a subscriber is connected to the in-home splitter 18. The in-home device includes, e.g., television receivers 11 and 13, a personal computer (PC) 14, a videophone 15, and a digital telephone 16.

Of these in-home devices, the television receiver 13 for a subscriber who desires the VOD services is provided with a set-top box (G-STB) 31 associated with the gate switch. If the television receiver 13 has only an existing set-top box (N-STB) 33 not associated with the gate switch, a non-associated modem adaptor (NGA) 34 is added to the N-STB 33.

Each of the personal computer 14, the videophone 15, and the digital telephone 16 is provided with a modem (G-MDM) 32 associated with the gate switch. If the device has only an existing modem (N-MDM) 35 not associated with the gate switch, the non-associated modem adaptor (NGA) 34 is provided in addition to the N-MDM 35.

The G-MDM 32 and the N-MDM 35 must be changed in accordance with the PC on-line services and the telephone services. However, since these functions are similar, and it can be expected that a common modem will be used in the future, a case using the common modem will be described.

When the subscriber does not desire the bidirectional services, e.g., when the subscriber receives only television broadcasting programs, the television receiver 11 is connected directly to the in-home splitter 18 without mediacy of the G-STB 31 and the like.

For example, the gate switch unit (GSU) 30 is constituted as follows. FIG. 2 is a block diagram showing the arrangement of the GSU 30. The GSU 30 comprises first and second frequency band separation circuits 103 and 105, a gate switch 109, and a transmission indication signal detection circuit 113.

The first frequency band separation circuit 103 comprises filters 103a and 103b for separating a frequency band H in the downward direction and a frequency band L in the upward direction. The first frequency band separation circuit 103 is connected to the drop cable 9 via a connector 102. The second frequency band separation circuit 105 comprises filters 105a, 105b, and 105c for separating the frequency band H in the downward direction, the frequency band L in the upward direction, and a frequency band C of a transmission indication signal, and is connected to the in-home splitter 18 via a connector 106 and an in-home drop coaxial cable 107. FIG. 3 shows the filter characteristics of the first and second frequency band separation circuits 103 and 105.

The gate switch 109 is interposed and set in an upward signal path between the filter 105b of the second frequency band separation circuit 105 and the filter 103b of the first frequency band separation circuit 103. The ON/OFF state of the gate switch 109 is controlled by a switch control signal output from the transmission indication signal detection circuit 113. FIG. 4 shows the timing relationship between the transmission indication signal, the switch control signal, and an upward transmission signal.

Referring to FIG. 4, when the transmission indication signal appears on the in-home drop coaxial cable 107, the switch control signal output from the transmission indication signal detection circuit 113 becomes active a time t1 after this moment. The gate switch 109 is turned on upon reception of this switch control signal. When the gate switch 109 is turned on, the upward transmission signal appears on the in-home drop coaxial cable 107 a time t2 after this moment. After passing through the filter 105b and the gate switch 109, the upward transmission signal passes through the filter 103b and is sent from the connector 102 to the drop cable 9.

When the transmission indication signal is disabled, the switch control signal becomes inactive a time t3 after this moment, thereby turning off the gate switch 109. At this time, the transmission of the upward transmission signal is completed before the transmission indication signal is disabled. That is, the-transmission of the upward transmission signal is completed a time t4 before the moment at which the gate switch 109 is turned off. For this reason, the upward transmission signal is prevented from being interrupted upon turning off the gate switch 109.

Figure 5:
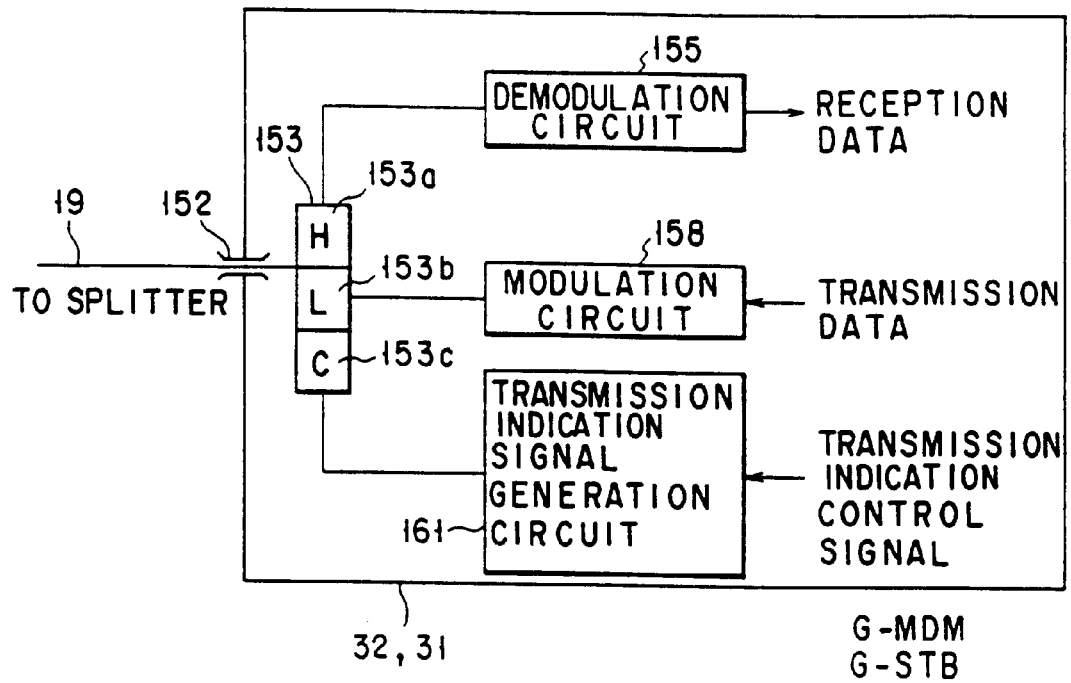
FIG. 5 is a block diagram schematically showing the arrangement of a G-STB or a G-MDM.

The additional functions of the G-STB 31 and the G-MDM 32 will be described below. FIG. 5 is a block diagram showing the arrangement of each circuit. Each of the G-STB 31 and the G-MDM 32 comprises a transmission indication signal generation circuit 161 and a frequency band separation circuit 153 in addition to a demodulation circuit 155 for demodulating a downward signal and outputting the reception data, and a modulation circuit 158 for modulating and transmitting transmission data.

The frequency band separation circuit 153 has filters 153a, 153b, and 153c for separating the frequency band H in the downward direction, the frequency band L in the upward direction, and the frequency band C of the transmission indication signal, similar to the second frequency band separation circuit 105 of the gate switch unit 30 described above. The frequency band separation circuit 153 is connected to the in-home splitter 18 via a connector 152 and an in-home drop coaxial cable 19.

Figure 6:
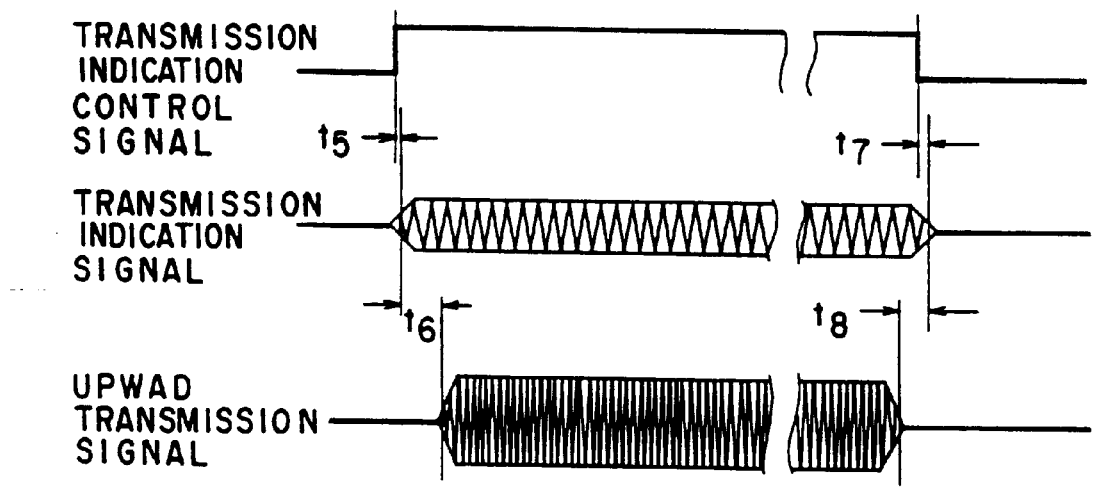
FIG. 6 is a timing chart used to explain the operation of the G-STB or the G-MDM shown in FIG. 5.

The transmission indication signal generation circuit 161 generates the transmission indication signal upon reception of a transmission indication control signal from a transmission data processing section side (not shown). This transmission indication signal is sent to the in-home splitter 18 via the filter 153c and the connector 152. FIG. 6 is a timing chart for these signals. Referring to FIG. 6, the transmission data processing section outputs the transmission indication control signal prior to transmission of the upward transmission signal. Then, the transmission indication signal generation circuit 161 generates the transmission indication signal a time t5 after the moment at which the transmission indication control signal becomes active. The transmission data processing section supplies the upward transmission signal a time t6 after the generation start point of the transmission indication signal. On the other hand, when the transmission of the upward transmission signal is completed to make the transmission indication control signal inactive, the transmission of the transmission indication signal is stopped a time t7 after this moment.

Figure 7:
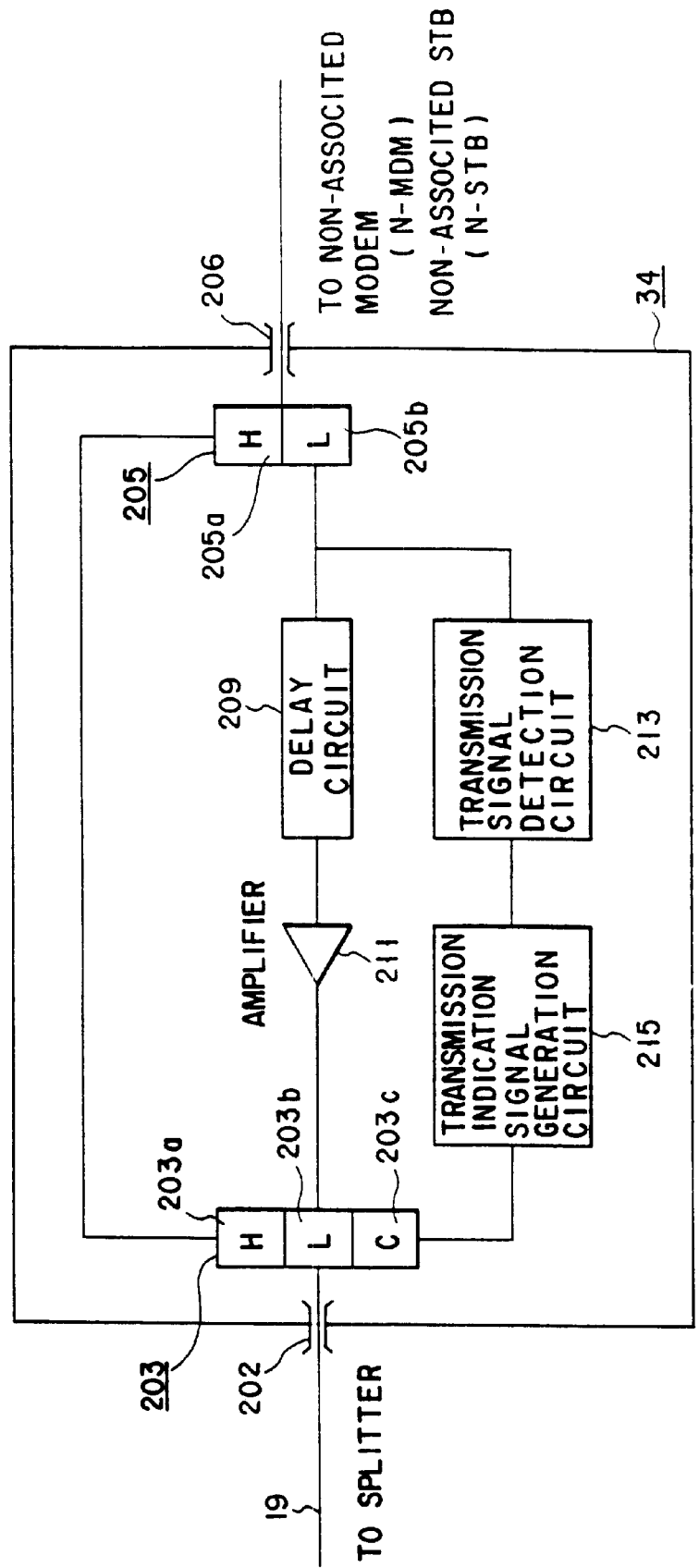
FIG. 7 is a block diagram showing the arrangement of a non-associated modem adaptor (NGA)

The non-associated modem adaptor (NGA) 34 connected to the existing STB (N-STB) 33 or the modem (N-MDM) 35 not associated with the GSU 30 is constituted as follows. FIG. 7 is a block diagram showing the arrangement of the NGA 34. The non-associated modem adaptor 34 comprises first and second frequency band separation circuits 205 and 203, a delay circuit 209, an amplifier 211, a transmission signal detection, circuit 213, and a transmission indication signal generation circuit 215.

The first frequency band separation circuit 205 has filters 205a and 205b for separating the frequency band H in the downward direction and the frequency band L in the upward direction. The first frequency band separation circuit 205 is connected to the N-STB 33 or the N-MDM 35 via a connector 206. The second frequency band separation circuit 203 has filters 203a, 203b and 203c for separating the frequency band H in the downward direction, the frequency band L in the upward direction, and the frequency band C of the transmission indication signal. The second frequency band separation circuit 203 is connected to the in-home splitter 18 via a connector 202. The first and second frequency band separation circuits 205 and 203 have the same filter characteristics as those of the first and second frequency band separation circuits 103 and 105 of the GSU 30 described above, i.e., the characteristics shown in FIG. 3.

The transmission signal detection circuit 213 detects the upward transmission signal transmitted from the N-STB 33 or the N-MDM 35. The transmission signal detection circuit 213 generates the transmission indication control signal during the detection period of the upward transmission signal and supplies it to the transmission indication signal generation circuit 215. The transmission indication signal generation circuit 215 generates the transmission indication signal in accordance with the transmission indication control signal supplied from the transmission signal detection circuit 213. The transmission indication signal is sent to the in-home splitter 18 via the filter 203c of the second frequency band separation circuit 203 and the connector 202.

FIG. 8 shows the timing relationship between the transmission indication control signal, the transmission indication signal, and the upward transmission signal. Referring to FIG. 8, when the upward transmission signal is supplied from the N-STB 33 or the N-MDM 35, the transmission indication control signal output from the transmission signal detection circuit 213 becomes active a time t11 after this moment. Upon reception of this transmission indication control signal, the transmission indication signal generation circuit 215 starts to generate the transmission indication signal a time t12 after this moment. The upward transmission signal is input to the delay circuit 209. The delay circuit 209 outputs the upward transmission signal by a delay time t14, which is the sum of the time t11 required to detect the upward transmission signal, the time t12 required to generate the transmission indication signal, and the operation delay time t13 of the gate switch 109 of the GSU 30 described above.

The delay amount t14 of the delay circuit 209 is about several to several tens μsec at most. Therefore, the delay circuit 209 can be realized by a surface acoustic wave element, a glass delay element, or the like. Note that, if the specific band (which is the ratio of the central frequency to the pass bandwidth and is 1.55 for an upward band of 5 to 40 MHz ) exceeds 1, it becomes difficult to realize the delay circuit 209 by one delay element because of limitations on the characteristics of the delay element.

As a solution for this problem, for example, the following methods can be considered. That is, according to the first method, the frequency of the upward transmission signal is converted into a higher frequency in the delay circuit 209, and the obtained signal is input to the delay element. Upon delay processing, the frequency of the upward transmission signal is returned to the original frequency. According to the second method, the delay circuit 209 is constituted by combining, e.g., two delay elements for a band of 5 to 15 MHz and a band of 15 to 40 MHz . According to the third method, e.g., the target frequency band of the NGA is limited to 20 to 40 MHz, and target existing services of the NGA are shifted to the band of 20 to 40 MHz and operated.

The upward transmission signal output from the delay circuit 209 with a delay in this manner is amplified by the amplifier 211 to compensate for the attenuation amount of the signal in the delay circuit 209 and then sent to the in-home splitter 18 via the filter 203b and the connector 202.

On the other hand, when the output of the upward transmission signal from the N-STB 33 or the N-MDM 35 is stopped, the transmission indication control signal goes to low level a time t15 after this moment. Upon reception of the transmission indication control signal of low level, the transmission indication signal becomes inactive a time t16 after this moment. At this time, the time t15 is properly set in consideration of the delay time t14 in the delay circuit 209. With this setting, the upward transmission signal on the in-home drop coaxial cable 19 substantially disappears a time t17 before the transmission indication signal becomes inactive. The NGA 34 must be constituted such that the NGA 34 does not malfunction due to noise, i.e., that the transmission signal detection circuit 213 does not erroneously detect noise as the upward transmission signal. For this purpose, the NGA 34 is directly coupled to the N-MDM 35 or the N-STB 33 without any connector open terminal therebetween.

As described above, in this embodiment, the GSUs 30 are installed in almost all subscriber residences. In addition, the G-STB 31 and the G-MDM 32 are set for a subscriber who wants to receive the bidirectional services. Alternatively, the NGA 34 is attached to the existing N-STS 33 or N-MDM 35. The presence of the upward transmission signal from an in-home device is checked by the G-STB 31 and G-MDM 32 or the NGA 34. While the upward transmission signal is detected, the transmission indication signal is supplied to the GSU 30. Only while the transmission indication signal is output, the gate switch 109 in the GSU 30 is in the ON state to send the upward transmission signal to the drop cable 9. To the contrary, while no transmission indication signal is output, the gate switch 109 is kept in the OFF state.

Even if, therefore, there is a connector open terminal to which no in-home device is connected in the subscriber residence, the connection state of the in-home device is bad, or a used coaxial cable is insufficient in electromagnetic cutoff characteristics, noise flowing from the connector open terminal or the coaxial cable is cut off by the gate switch 109 and is not sent to the drop cable 9 except when the GSU 30 is in the ON state, i.e., except during the transmission period of the upward transmission signal. For this reason, the ingress noise level on the upward transmission path of the system can be suppressed greatly.

For example, the noise removing ratio is set to 40 dB when the GSU 30 is in the OFF state, and the maximum number of GSUs 30 simultaneously turned on is 1% of the number of subscribers (the number of subscribers who simultaneously perform communication at a given moment; almost equal to the number of upward carriers). In this case, as shown in FIG. 9, the narrowband coherent noise, the broadband incoherent noise, and the specific subscriber noise can be suppressed to 28 dB, about 20 dB, and 40 dB, respectively, in addition to the above-described suppression effect of the HFC architecture. A very-high-quality transmission environment can be realized. In other words, the cable network system can be designed or operated without considering the presence of ingress noise, thereby achieving an enhanced effect.

More specifically, many of the above-described ingress noise measures, which have been considered until now, are not required, and restriction conditions can be less strict. For example, as for the HFC architecture, the cable network system in the upward direction need not be operated for every subsystem. If it is operated for 5 subsystems as a unit, similar to the downward direction, the bidirectional services can be provided under a high-quality transmission environment. In addition, not only the frequency agility function but also band reduction+frequency division multiplex are not required. To decrease the number of GSUs simultaneously turned on (the number of subscribers who simultaneously perform communication), it is desirable to employ a broadband time-division multiplex scheme. Further, the error correction functions are also reduced, and the retransmission number when errors cannot be corrected is also greatly reduced. The transmission efficiency can be improved, and a high-efficiency modulation scheme of 16 QAM, 64 QAM, or the like can be applied, which has been difficult to apply in the upward direction.

In other words, a high-quality transmission environment can be provided over the entire band of the upward transmission path by applying this embodiment. For this reason, a bandwidth assignable to services can be widened 2 to 5 times. The transmission ability of the upward transmission path, which is conventionally limited to about 10 Mbps, can increase to 100 Mbps or more if a high-efficiency modulation system is applied. For example, the upward operation unit is set to one subsystem (500 home paths), the subscription ratio of the bidirectional services is 30%, and the simultaneous use ratio is 30%. In this case, the transmission ability of 2 Mbps or more can be ensured per subscriber. Even if the upward operation unit is set for 5 subsystems, the transmission ability of 400 kbps or more can be ensured per subscriber. These transmission abilities respectively correspond to an ISDN service H1 (1.544 Mbps; called T1 in United States) and a service H0 (384 kbps) in a telephone system, resulting in a great effect in the cable network system.

Note that cable industrial companies make investment in attachment of the GSUs 30 to all the subscriber residences. However, if a plurality of subscribers share one GSU 30, an equivalent effect can be obtained. For example, two subscribers share one GSU 30. In this case, although the narrowband coherent noise and the broadband incoherent noise are respectively increased by about 3 to 4 dB, a transmission environment much higher in quality than a conventional transmission environment can be provided.

In the above description, the noise removing ratio is set to, e.g., 40 dB when the GSU 30 is in the OFF state. Even if the noise removing ratio is set to 20 dB or less with respect to the narrowband coherent noise or the broadband incoherent noise, a sufficient noise suppression effect free from any problem in practical use can be obtained. An increase in noise suppression ratio means an improvement in resistance of the system to the specific subscriber noise, which is supposed to be at high noise level.

Further, in the arrangement of this embodiment, all upward signals are delayed by several to several tens $\mu$sec. This is become transmission paths are prolonged by about 1 km to several km at most, and does not pose any problem in the operation of various bidirectional services.

When the GSU 30 is inserted between the drop cable 9 and the in-home splitter 18 in the subscriber residence, its installation or design must be considered carefully.

The first point is that a work required for an operator to enter the subscriber residence must be avoided as much as possible. This is an indispensable condition particularly in United States where people feel anxious about the security aspect. Therefore, it is a prerequisite that the GSU 30 is attached outside the residence, e.g., under the eaves.

The second point is that the GSU 30 must operate without any supply of power from a commercial AC power supply. The reason is that an additional work for the power supply is required to supply power from the commercial AC power supply to the GSU 30 set, e.g., under the eaves, as described above, resulting in an increase in work cost. It is possible to supply power from the cable system side via a drop cable, like a cable telephone system (to be described later). In a system not providing the services, however, a tap-off, a splitter, a booster amplifier, or the like must be exchanged with a corresponding one of the current through type. On the other hand, according to another power supply method, power is supplied from a G-MDM, a G-STB, or the like in the subscriber residence. In this method, however, it must be taken into consideration that the G-MDMs or the like are not installed in all the subscriber residences, and that the installed G-MDMs or the like are not always powered on or turned on.

The third point is that the passing loss when an upward path is set in the conductive state must be minimized, in addition to a reduction in passing loss in the downward path. If the loss is large in the GSU 30 the signal level distribution in the whole cable network system must be reconsidered. It is important to reduce the loss to a degree (within 1 to 2 dB) posing no problem in practical use under the condition of no external power supply.

The fourth point is that the GSU 30 must be prevented from malfunctioning due to noise flowing from a connector open terminal. It can be considered as a type of malfunction that the GSU 30 is turned on with no normal upward signal or fails to be turned on with a normal upward signal. In addition, the GSU 30 is desirably provided with a protection (security) means to prevent specific subscriber noise and particularly an interference signal from a malicious subscriber from being easily transmitted.

Figure 10:
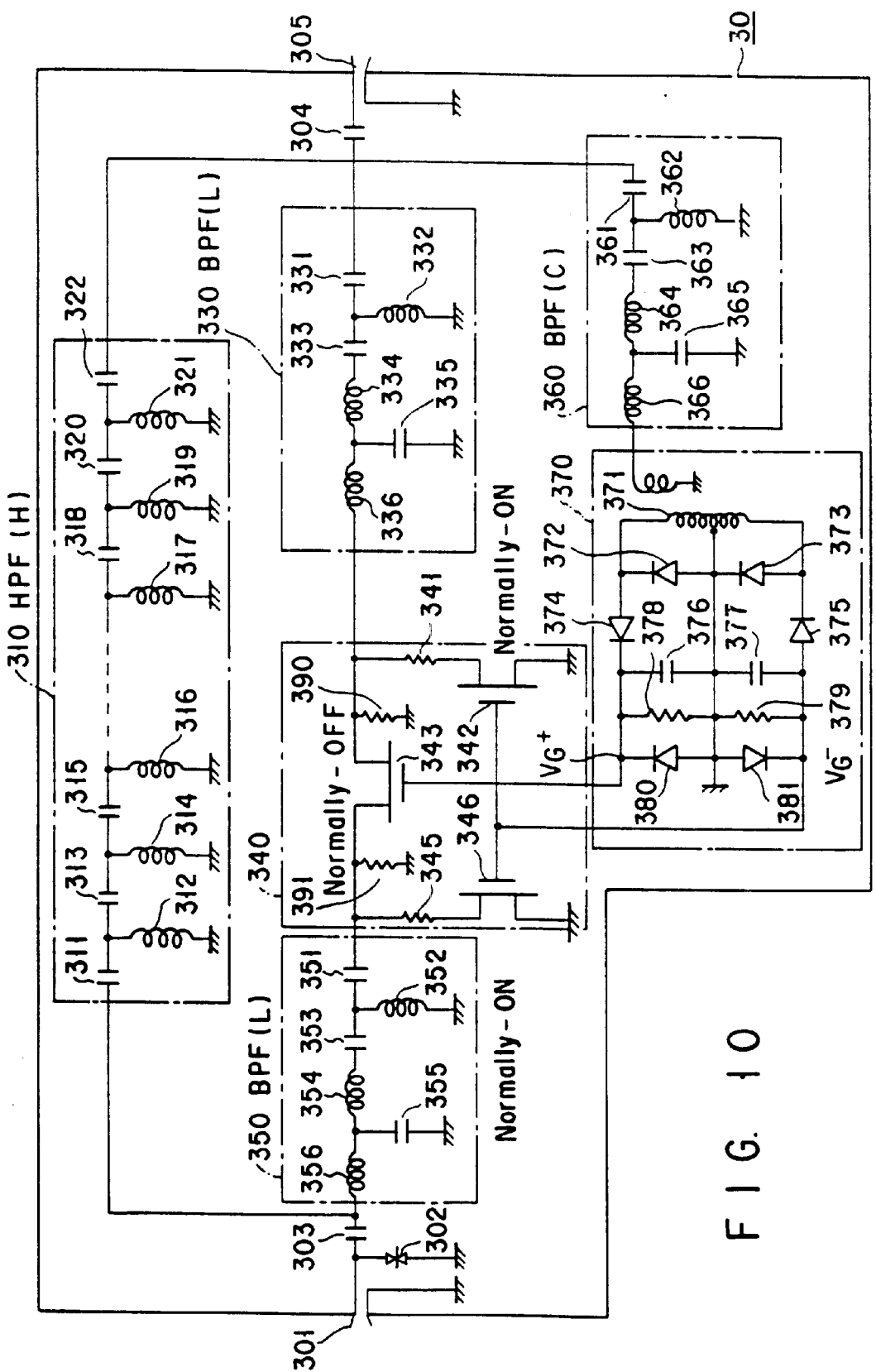
FIG. 10 is a circuit diagram showing a detailed configuration of the GSU.

FIG. 10 shows a detailed circuit configuration of the GSU 30 in consideration of the various problems. This circuit operates using the transmission indication signal sent from the G-MDM or the like, as a power supply. A high-pass filter (HPF) 310 is connected between a connector 301 connected to the drop cable 9 and a connector. 305 connected to the in-home splitter 18. The HPF 310 corresponds to the filters 103a and 105a shown in FIG. 2, and is constituted by connecting capacitors and inductances 311 to 322 in a ladder shape.

A series circuit constituted by two bandpass filters (BPFS) 330 and 350 and a gate switch 340 is connected between the connectors 301 and 305 so as to be parallel to the HPF 310. The BPFs 330 and 350 correspond to the filters 105b and 103b shown in FIG. 2, respectively. Each BPF is constituted by hybrid-connecting capacitors and inductors, as shown in FIG. 10.

The gate switch 340 corresponds to the gate switch 109 shown in FIG. 2, and is constituted by field effect transistors 342, 343, and 346, and resistors 341, 345, 390, and 391. The transistors 342 and 346 are of the normally-ON type in which a transistor is in the ON state while no gate voltage is applied. The transistor 343 is of the-normally-OFF type in which a transistor is in the OFF state while no gate voltage is applied.

More specifically, when no gate voltage is applied to the transistors 342, 343, and 346, the transistors 342 and 346 are in the ON state, whereas the transistor 343 is in the OFF state. For this reason, noise flowing from the in-home side via the connector 305 and the bandpass filter 330 is terminated with a predetermined impedance defined by the resistor 341. As a result, the inflow noise is prevented from flowing out to the drop cable 9 via the connector 301. That is, at this time, the GSU 30 can be considered as if the GSU 30 was terminated with the predetermined impedance defined by the resistor 345 when viewed from the drop cable 9 side. Note hat the resistors 390 and 391 are for determining the source and drain potentials of the transistors 342, 343, and 346, and have resistance values larger than those of the resistors 341 and 345.

On the other hand, when the gate voltage is applied to the transistors 342 and 346 via a transmission indication signal detection circuit 370 to reach a predetermined threshold value (negative voltage in the example of FIG. 10; $V_{G-}$), the transistors 342 and 346 are turned off, and instead the transistor 343 is turned on. For this reason, after passing through the connector 305 and the bandpass filter 330, the upward transmission signal sent from the in-home splitter 18 side passes through the transistor 343 and is sent to the drop cable 9 via the bandpass filter 350 and the connector 301.

The field effect transistors 341, 343, and 346 of this type can be realized by gallium arsenide transistors of a depletion type (normally-ON type) or an enhancement type (normally-OFF type). FIGS. 11A and 11B show the ON characteristics of the gallium arsenide transistors of the depletion and enhancement types, respectively. Each ON resistance can be set to less than several ohms or a few ohms in accordance with design. Each transistor can be provided with sufficient cutoff characteristics. Note that a similar transistor can also be realized by a silicon transistor in addition to the gallium arsenide transistor. Since the parasitic capacitance between the source and drain is fractionally larger than that of gallium arsenide transistors, a slight degradation of cutoff characteristics occurs. To obtain the sufficient cutoff characteristics, the resistance value in the ON state increases, resulting in an increase in passing loss.

Therefore, by careful circuit or process design, the use of normally-ON type and normally-OFF type silicon transistors, or a combination of gallium arsenide transistors (normally-ON type) and silicon transistors (normally-OFF type) is possible.

By applying field effect transistors of the normally-OFF type, any voltage need not be applied at all to the respective transistors in a normal state (the GSU is powered off or turned off). For this reason, only when the GSU is turned on, a predetermined voltage is applied to the gates of the respective transistors.

Furthermore, the transmission indication signal detection circuit 370 is connected to the connector 305 on the in-home side via a bandpass filter (BPF) 360. The bandpass filter 360 corresponds to the filter 105c shown in FIG. 2, and is constituted by hybrid-connecting capacitors and inductors, as shown in FIG. 10.

The transmission indication signal detection circuit 370 corresponds to the transmission indication signal detection circuit 113 in FIG. 2, and is constituted by a transformer 371, diodes 372 to 375 serving as rectifying circuits, capacitors 376 and 377, resistors 378 and 379, and Zener diodes 380 and 381. The negative voltage $V_{G-}$ to be applied to the transistors 342 and 346 and a positive voltage $V_{G-}$ to be applied to the transistor 343 are generated from a transmission indication signal through these circuits.

Since the transmission indication signal sent from the G-STB 31, the G-MDM 32, or the NGA 34 passes through the in-home splitter 18 and the like, the signal is attenuated by about several to 10 dB and input to the GSU 30. In this arrangement, however, the transmission indication signal having passed through the bandpass filter 360 with a central equipment frequency of, e.g., 2 MHz is boosted by the transformer 371. The obtained signal is converted into a DC signal by the diode rectifying circuits 372 to 375. Further, predetermined negative and positive voltages are kept by the Zener diodes 380 and 381.

The capacitors 376 and 377 and the resistors 378 and 379 give the gate switch 340 a time constant. When the transmission indication signal is sent, the diode rectifying circuits 372 to 375 have low resistances. For this reason, the parasitic capacitances of the capacitors 376 and 377 and the transistors 342, 343, and 346 are charged within a short time (e.g., 1 $\mu$sec or less). When the transmission indication signal disappears, the diode rectifying circuits 372 to 375 have high resistances. For this reason, the capacitors 376 and 377 are gradually discharged in accordance with the above time constant (e.g., several to several tens $\mu$sec). With this operation, the gate switch 340 can be reliably kept in the ON state until the upward transmission signal passes through the gate switch 340, as shown in FIG. 4.

An arrester 302 for preventing a surge voltage caused by thunder, and a capacitor 303 are connected to the connector on the drop cable 9 side. The capacitor 303 prevents AC power and DC power from being supplied to the GSU 30 when the AC power is sometimes supplied to an in-home modem via the drop cable 9, like the cable telephone services (to be described later).

The circuit having this arrangement can operate without any commercial power supply or any supply of power via the drop cable. The passing loss through the filters 310, 330, and 350 can be greatly reduced by selecting element characteristics. The passing loss in the GSU 30 can be greatly reduced to about 1 to 2 dB in both the upward and downward directions by properly designing the field effect transistors 342, 343, and 346 for the gate switch 340. In addition, the transmission indication signal detection circuit 370 can be made less reactive with respect to electromagnetic noise flowing from a connector open terminal or the like by combining the band limitation of the bandpass filter 360 and the field effect transistors 342, 343, and 346 having predetermined threshold values, or by adding a squelch circuit (not shown) having a predetermined threshold value to the transmission indication signal detection circuit. In other words, the transmission indication signal detection circuit 370 is constituted to react to only the transmission indication signal having predetermined power (voltage) and more within a predetermined frequency band. With this arrangement, the operation is properly enhanced.

Assume that the GSU 30 is attached outside, e.g., under the eaves of the subscriber residence. In this case, if the subscriber removes the GSU 30 without permission and directly connects the drop cable 9 to the in-home splitter 18, or attaches another device such as a tap-off between the GSU 30 and the drop cable 9, the effect of the GSU 30 is degraded. To prevent this degradation, for example, the connector 301 for connecting the drop cable 9 is sealed upon connection of the drop cable 9, or the GSU 30 is installed such that it cannot be removed without using a specific tool. To prevent the GSU 30 itself from flowing noise to the upward transmission path, the housing of the GSU 30 is covered with a material having electromagnetic shielding characteristics, such as a metal.

Another arrangement of the gate switch as a main constituent element of the GSU 30 will now be described. In the above-described example, the ingress noise is cut off by the enhancement type transistor 343 in a normal state (the GSU 30 is in the OFF state). However, if noise larger than the threshold value of the transistor 343 flows, the transistor 343 is turned on to flow the noise from the GSU 30 to the drop cable.

Figure 12:
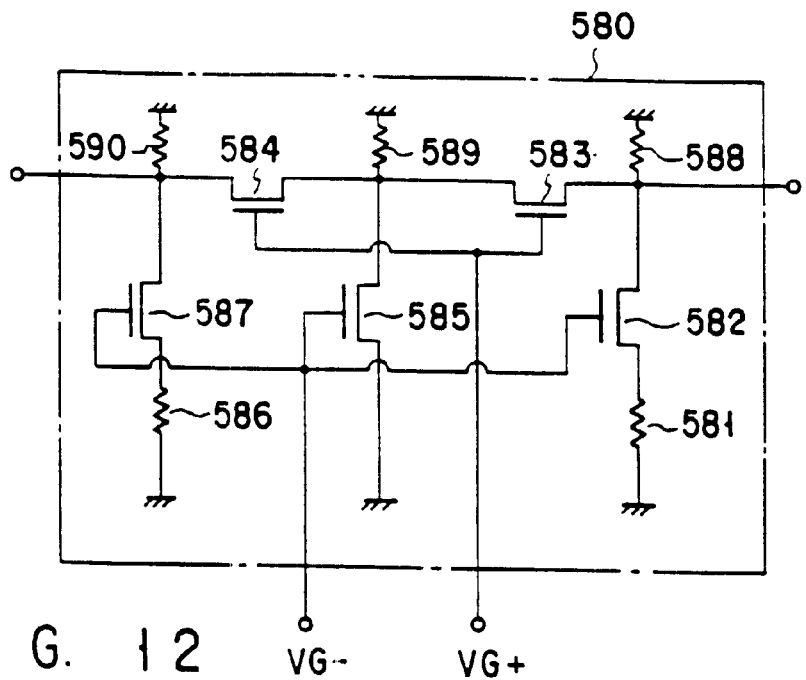
FIG. 12 is a circuit diagram showing another arrangement of the gate switch.

FIG. 12 shows an example of a gate switch having a function of preventing the outflow of the ingress noise. In a gate switch 580, resistors 581 and 586 and normally-ON type transistors 582 and 587 have the same functions of the resistors 341 and 345 and the normally-ON type transistors 342 and 346, respectively. normally-OFF type transistors 583 and 584 and. a normally-ON type transistor 585 are combined to cut off excess ingress noise. More specifically, the normally-OFF type transistor 583 is normally in the OFF state. However, even if excess noise exceeds the threshold value of the transistor 583 to turn on the transistor 583, the transistor 583 is short-circuited to the earth by the normally-ON type transistor 585 which is normally in the ON state. For this reason, such excess noise as to turn on the normally-OFF type transistor 584 is not applied to the transistor 584. The transistor 584 is kept in the OFF state.

On the other hand, when the voltages $V_{G+}$ and $V_{G-}$ are applied from the transmission indication signal detection circuit to the transistors 583 and 584 and the transistors 582, 585, and 587, respectively, the ON/OFF state of each transistor is inverted to allow the upward transmission signal to pass through the gate switch 580. Resistors 588, 589, and 590 correspond to the above-described resistors 390 and 391, and determine the source and drain potentials of the corresponding transistors.

Figure 13:
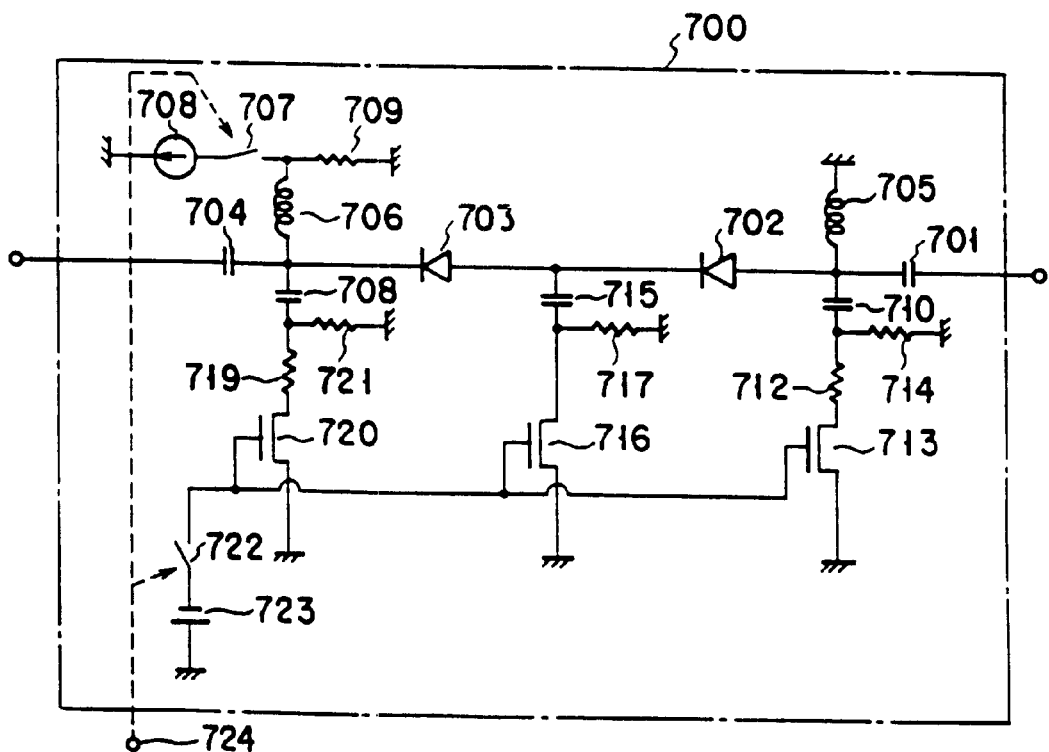
FIG. 13 is a circuit diagram showing still another arrangement of the gate switch.

FIG. 13 shows the arrangement of another gate switch. A gate switch 700 uses PIN diodes 702 and 703 which are frequently used as RF switching elements, instead of the transistors 583 and 584 of the normally-OFF type.

Referring to FIG. 13, even if no power is supplied from the G-MDM or the like to the GSU 30, the PIN diodes 702 and 703 are normally in the OFF state (the GSU 30 is in the OFF state). Even if noise larger than the threshold voltage of the PIN diode is applied to the GSU 30, the PIN diode 703 is kept in the OFF state by the operation of a normally-ON type transistor 716, similar to the example described above. As a result, noise is prevented from flowing from the GSU 30.

On the other hand, when the GSU 30 is in the ON state, a switch 707 is turned on by a signal sent from the transmission indication signal detection circuit. A predetermined current flows through an inductance 705, the PIN diodes 702 and 703, an inductance 706, and a current source 708 to turn on the PIN diodes 702 and 703 in an RF manner. To the contrary, a switch 722 is turned on to apply a negative potential to the gates of transistors 713, 716, and 720 and to turn off the PIN diodes 702 and 703. Capacitors 710, 715, and 718 in FIG. 13 separate the PIN diode system and the transistor systems in a DC manner. Resistors 714, 717, 721, and 709 are resistors to normally apply a DC potential to the PIN diodes and the transistors.

In this circuit, a current of about 10 mA must be supplied to the PIN diodes, resulting in an increase in electric energy to be supplied from the G-MDM or the like. However, DC or AC power may be supplied to the GSU 30 from the G-MDM or the like via the coaxial cable 19 and the splitter 18, in addition to the above-described transmission indication signal.

To prevent a current from a given modem from reversely flowing into another modem when a plurality of modems or the like are simultaneously turned on, a reverse flow prevention diode is inserted in the output stage of each modem.

Figure 14:
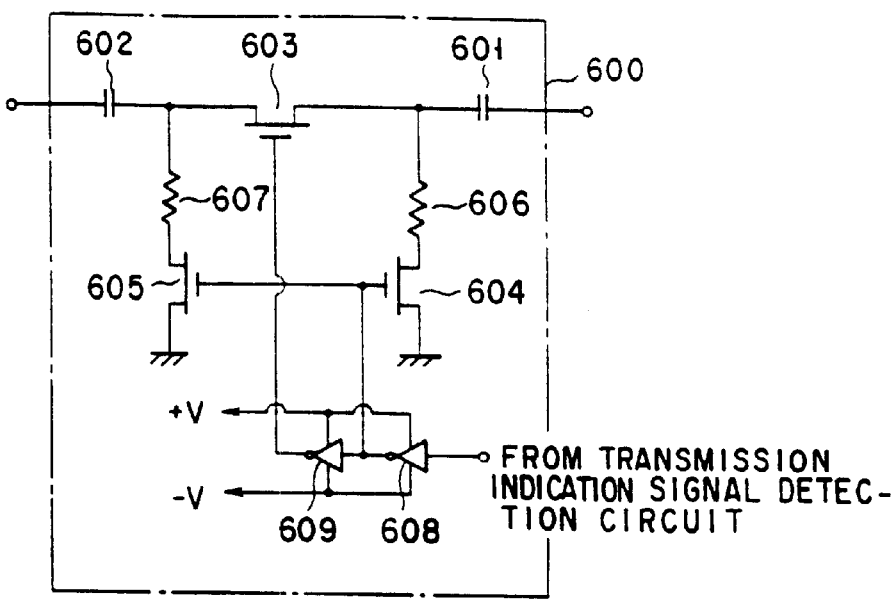
FIG. 14 is a circuit diagram showing still another arrangement of the gate switch.

FIG. 14 shows the configuration of still another gate switch. A gate switch 600 is constituted by only depletion type transistors. Referring to FIG. 14, a negative potential is applied to the gate of a transistor 603 via inverters 608 and 609 in a normal state (the GSU 30 is in the OFF state), whereas a positive potential is applied to the respective gates of transistors 604 and 605. To the contrary, when the GSU is in the ON state, a positive potential is applied to the transistor 603, whereas a negative potential is applied to the transistors 604 and 605. In this configuration, all the transistors 604 and 605 can be of the depletion type. Therefore, the process cost can be reduced, and a reliable operation can be ensured. Note that slight power (about tens of microwatts) must be constantly supplied to the GSU 30 via the drop cable or the like.

Note that any power supply means via the drop cable or any power supply circuit corresponding to the supply of DC or AC power from the modem or the like in the subscriber residences is not shown in FIG. 2, FIG. 10. Nor are they described here since they are well known in the art.

Figure 16:
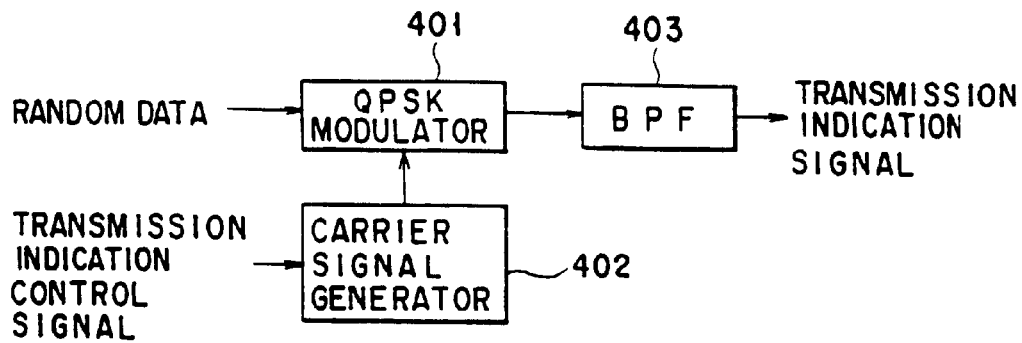
FIG. 16 is a block diagram showing a detailed arrangement of a transmission indication signal generation circuit.

A detailed example of the transmission indication signal generation circuit will be described below. FIG. 16 is a block diagram showing the arrangement of this circuit. Each of the transmission indication signal generation circuits 161 and 215 comprise; a QPSK modulator 401, a carrier signal generator 402, and a BPF 403.

Upon reception of the transmission indication control signal, the carrier signal generator 402 generates a carrier signal in accordance with this signal, and supplies it to the QPSK modulator 401. The QPSK modulator 401 QPSK-modulates the carrier signal in accordance with a random data sequence. The band of the modulated carrier signal is limited by the bandpass filter (BPF) 403. Then, the resultant signal is output as the transmission indication signal to the GSU 30 together with the upward transmission signal.

The reason why the transmission indication signal is modulated in accordance with the random data sequence is as follows. That is, assume that a plurality of the G-STBs 31, the G-MDMs 32, or the NGAs 34 are installed in a residence, and these devices simultaneously output unmodulated transmission indication signals slightly different in frequency. These signals collide with each other to generate a beat. At this time, the levels of the colliding transmission indication signals may extremely fall over a long time depending on differences in phase and signal level between the colliding transmission indication signals. As a result, the transmission indication signals seem as if they disappeared in the GSU 30. In such a case, the gate switch 340 is turned off though the transmission signals are passing therethrough. The transmission of the transmission signals is undesirably stopped.

In the arrangement of this embodiment, however, the carrier signal modulated in accordance with the random data sequence is used as the transmission indication signal. For this reason, when a plurality of transmission indication signals collide with each other, the time interval at which the signal levels fall can be probabilistically shortened. As for the fall of the signal levels, the malfunction of the GSU 30 can be suppressed to a desired probability or less by setting the time constant determined by the capacitor 376 and the resistor 378 to be sufficiently larger than the time interval. For example, assume that the time constant is set to 15 $\mu$sec, and that the transmission rate of the random data sequence is 1 Mbps, that the phase difference between undetectable carriers is 20%, that the phase difference between undetectable symbols is 5%, and that the simultaneous transmission (collision occurrence) probability is 1%. In this case, the malfunction probability of the GSU is $10^{-8}$ or less.

In the above example, the QPSK modulation is used. However, it is necessary that only the difference in phase or signal level between colliding signals changes randomly, and therefore another modulation scheme such as FSK modulation can be employed, as a matter of course.

Another means for avoiding the collision of the transmission indication signals is transmission control applied with a multiple access means such as a CSMA (Carrier Sense Multiple Access) scheme. That is, in transmitting the transmission indication signal, it is checked whether the transmission indication signal is sent from another G-MDM 32 or the like onto the cable 19, by using the leakage of the transmission indication signal to another G-MDM 32, G-STB 31, or NGA 34 via the in-home splitter 18. Only when no other G-STB 31, G-MDM 32, or NGA 34 transmits the transmission indication signal, the transmission indication signal is sent.

Figure 17:
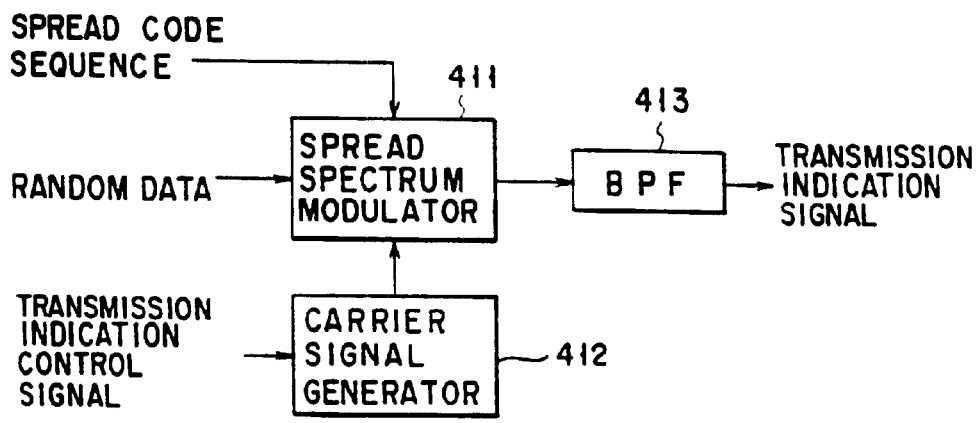
FIG. 17 is a block diagram showing another detailed arrangement of the transmission indication signal generation circuit.

Another detailed example of each of the transmission indication signal generation circuits 161 and 215 will be described. FIG. 17 is a block diagram showing the arrangement of this circuit. Referring to FIG. 17, a carrier signal is generated by a carrier signal generator 412 in accordance with the input of the transmission indication control signal. The carrier signal is first PSK- or FSK-modulated in accordance with the random data sequence. The modulated output signal undergoes spread spectrum modulation by a spread spectrum modulator 411 in accordance with a predetermined spread code sequence, and is output. The band of the spectrum-modulated output signal from the spread spectrum modulator 411 is limited by a BPF 413. Then, the resultant signal is sent as the transmission indication signal to the GSU 30.

Figure 18:
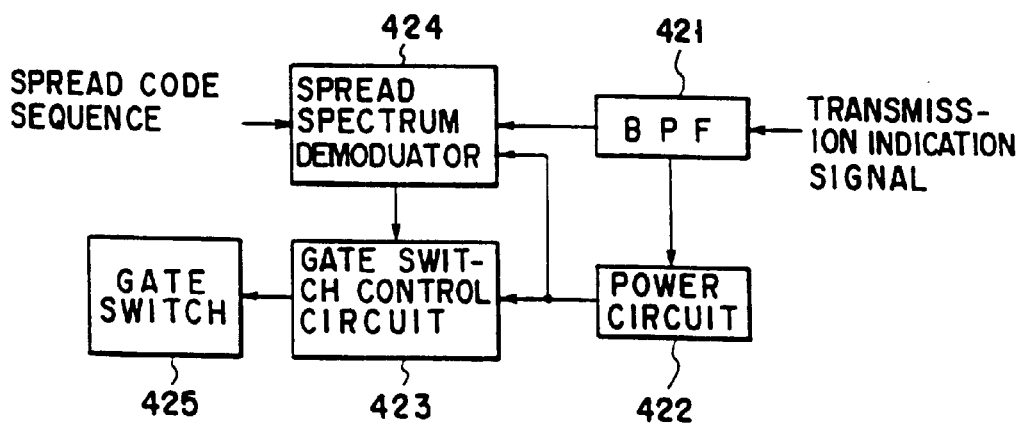
FIG. 18 is a block diagram showing an arrangement of a transmission indication signal detection circuit.

On the other hand, a transmission indication signal detection circuit for detecting the transmission indication signal having undergone the spread spectrum modulation is constituted as follows. FIG. 18 is a block diagram showing the arrangement of this circuit. Referring to FIG. 18, the transmission indication signal sent from the G-STB 31, the G-MDM 32, or the NGA 34 passes through a BPF 421 and is input to a power circuit 422 (e.g., the transmission indication signal detection circuit 370 shown in FIG. 10). Then, the power circuit 422 is energized to start supplying power to a gate switch control circuit 423 and a spread spectrum demodulator 424. Immediately after the supply of power, a gate switch 425 is turned on, and a timer in the gate switch control circuit 423 starts its counting operation.

If synchronization with the received transmission indication signal is established within a predetermined time, the spread spectrum demodulator 424 stops the timer. For this reason, the gate switch 425 is kept in the ON state. To the contrary, if the synchronization cannot be established within the predetermined time, and if the received transmission indication signal disappears to stop the supply of power, the timer has a time-out to reset the gate switch 425 in the OFF state.

The above-described generation and detection schemes for the transmission indication signal are realized by applying a so-called CDMA (Code Division Multiple Access) scheme to the generation and detection of the transmission indication signal. According to the CDMA scheme, even if there are a plurality of signals spectrum-spread in accordance with different spread code sequences or the same spread code sequence, synchronization is established with one of these signals. After the establishment, an operation is performed to keep this synchronization. Therefore, collision of the transmission indication signals with each other becomes allowable by applying this CDMA scheme.

In addition, according to the CDMA scheme, the transmission indication signal can be reliably discriminated from the specific subscriber noise, or from broadband noise even when a subscriber erroneously connects a digital device having a broad noise frequency band, such as a personal computer, to the cable network. For this reason, the operation reliability of the GSU 30 can be kept high.

When the transmission indication signal is generated and detected, the above-described spread code sequence is managed as a privacy key. With this management, the GSU 30 can be prevented from malfunctioning due to an interference signal from a malicious subscriber. Further, if a high-level security measure obtained by combining a public key scheme and a DES scheme or the like is applied to the transmission of the transmission indication signal, the transmission indication signal can be almost perfectly protected against malicious interference.

Figure 19:
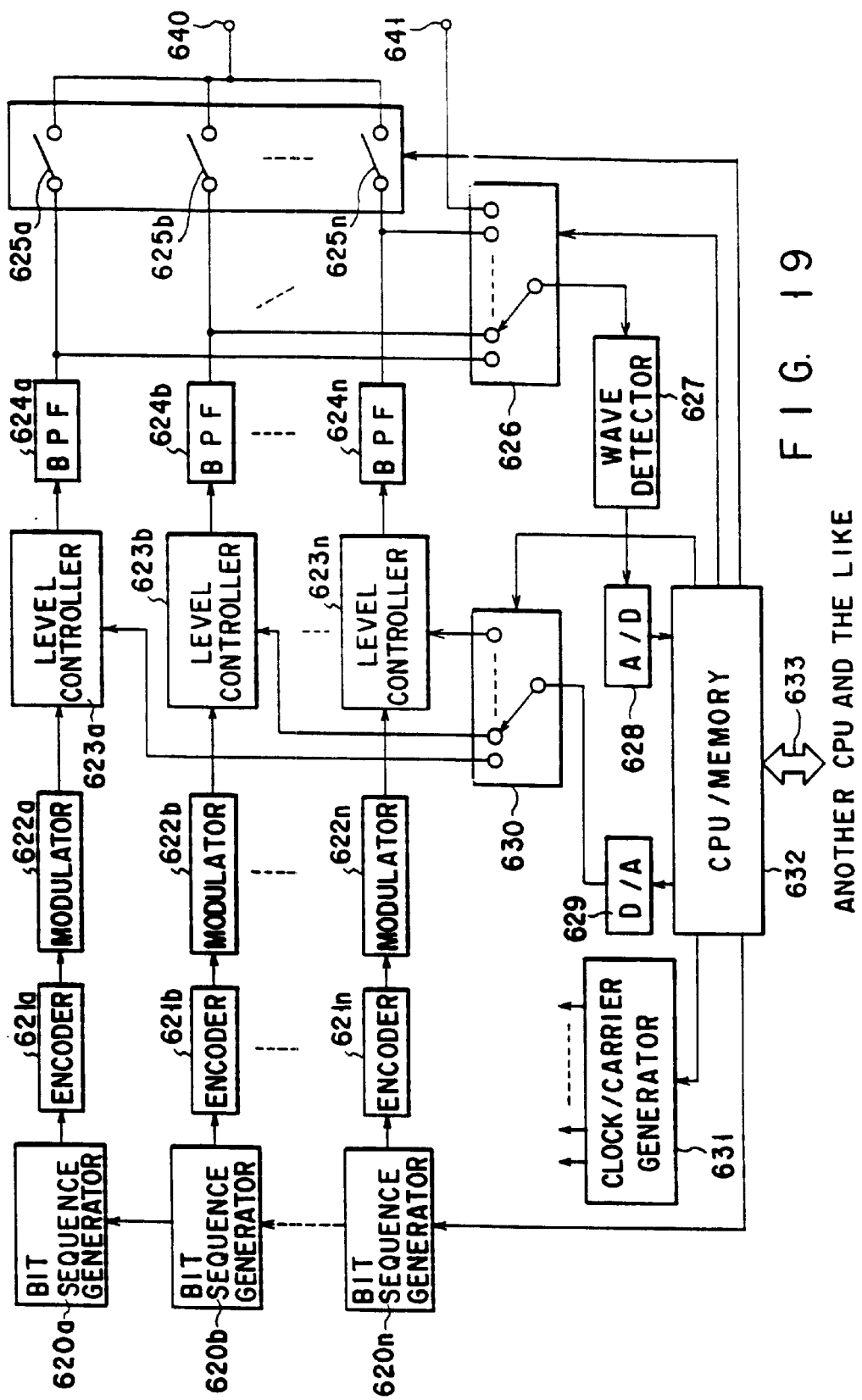
FIG. 19 is a block diagram showing another arrangement of the transmission indication signal generation circuit.
Figure 20:
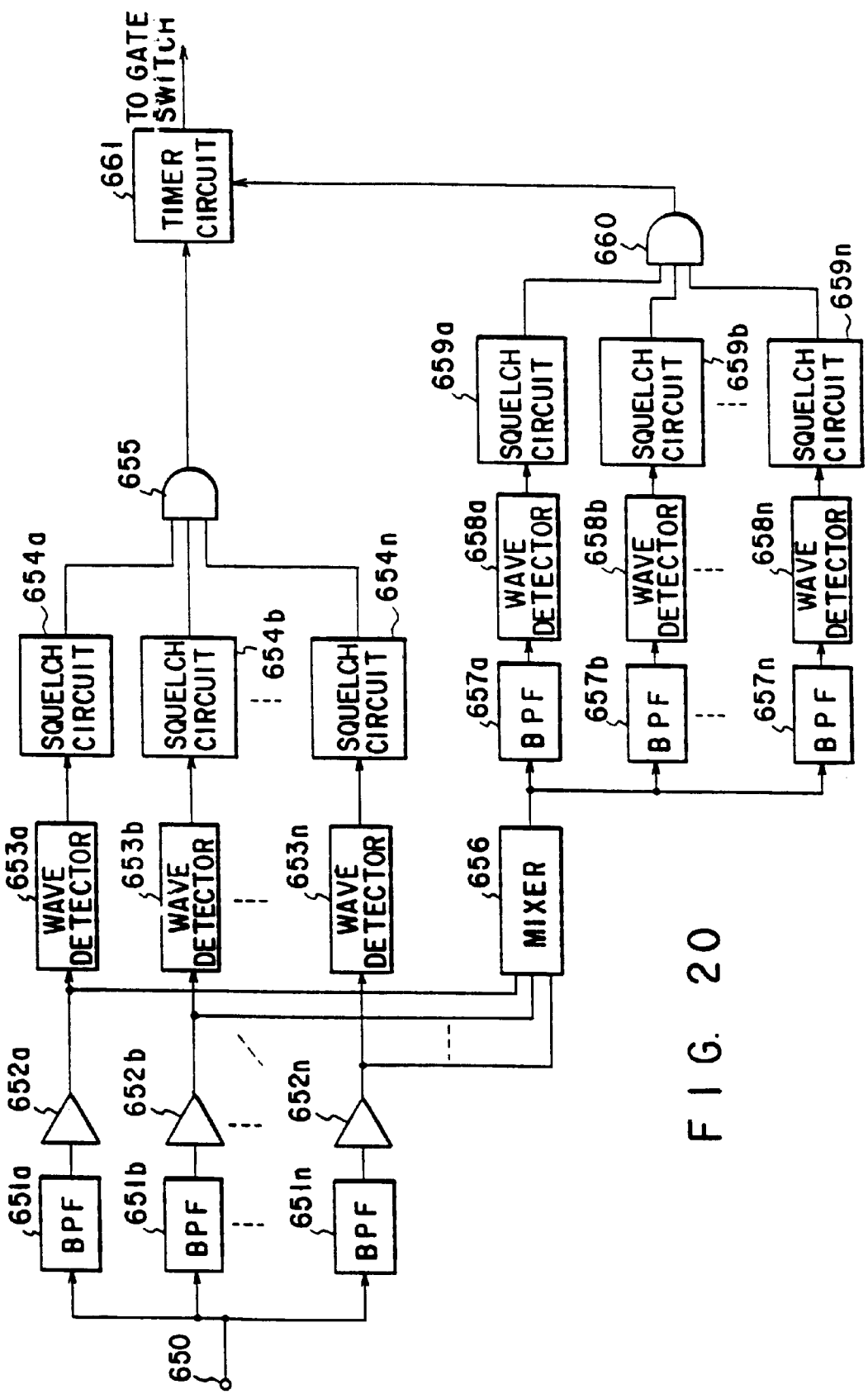
FIG. 20 is a block diagram showing another arrangement of the transmission indication signal detection circuit.

The transmission indication signal generation circuit 161 or 215, and the transmission indication signal detection circuit 113 can be respectively constituted as follows. FIGS. 19 and 20 are block diagrams respectively showing the arrangements of these circuits.

In these circuits, a plurality of carriers are transmitted as the transmission indication signals. Only when a plurality of predetermined carriers are detected in the GSU, the gate switch is turned on. With these arrangements, the resistance to noise and a mischief can be enhanced.

Referring to FIG. 19, bit sequence generators 620a to 620n generate random bit sequences or predetermined bit sequences. Encoders 621a to 621n encode the same bit sequences into signal sequences always including clock signal components, such as Manchester codes. The encoded signal sequences undergo predetermined modulation such as phase modulation or frequency modulation by corresponding modulators 622a to 622n. Thereafter, the modulated signal sequences pass through corresponding level controllers 623a to 623n and bandpass filters (BPFs) 624a to 624n, and are sequentially selected by corresponding switches 625a to 625n and sent from an output terminal 640.

When the power supply of the transmission indication signal generation circuit is turned on, the output signal level of each carrier is initialized in accordance with the following procedure. That is, the switches 625a to 625n are turned off in accordance with a command sent from a CPU 632 so as not to output the transmission indication signal from the G-MDM, the G-STB, or the NGA.

In this state, bit sequences are generated by the bit sequence generators 620a to 620n in accordance with a command sent from the CPU 632, respectively. These bit sequences are encoded into Manchester codes by the encoders 621a to 621n, and then phase- or frequency-modulated by the modulators 622a to 622n, respectively. Carriers output from the modulators 622a to 622n pass through the corresponding level controllers 623a to 623n and bandpass filters (BPFS) 624a to 624n to be input to a switch 626. These carriers are sequentially selected by the switch 626 and input to a wave detector 627. After wave detection, their wave detection signal levels are digitized by an A/D converter 628, and the resultant data are input to the CPU 632.

The CPU 632 calculates a difference between the wave detection signal level of each carrier and a preset reference signal level. If this difference is out of a predetermined error range, a gain control signal is output to reduce this difference. The gain control signal is converted into an analog voltage by a D/A converter 629. The converted signal is supplied to a corresponding one of the level controllers 623a to 623n via a switch 630, thereby controlling the gain. Upon completion of the initial level control for all the carriers, the bit sequence generators 620a to 620n and the modulators 622a to 622n are set in a wait state.

When the CPU 632 receives the transmission indication control signal requiring to output the transmission indication signal, via an interface 633 in this state, the CPU 632 supplies operation start instructions to the respective circuits in the wait state. Therefore, the bit generators 620a to 620n and the modulators 622a to 622n which are in the wait state are simultaneously start to operate. At the same time, the switches 625a to 625n are also turned on, thereby sending the transmission indication signals using a plurality of carriers.

Note that, in FIG. 19, signal paths from the CPU 632 and a clock/carrier generator 631 to the bit sequence generators 620a to 620n, the encoders 621a to 621n, the modulators 622a to 622n, and the like are not shown to avoid complexity.

The operation of the transmission indication signal detection circuit shown in FIG. 20 will be described below. The plurality of carriers having sent are separated by corresponding bandpass filters (BPFS) 651a to 651n, and amplified by predetermined gains in corresponding amplifiers 652a to 652n. Thereafter, the obtained carriers are wave-detected by corresponding wave detectors 653a to 653n. Squelch circuits (or analog comparators) 654a to 654n check whether wave detection outputs from the wave detectors 653a to 653n have a predetermined signal level. The determination results are input to an AND gate 655. Only when the all the carriers have the predetermined signal level, the AND gate 655 generates a timer start signal and supplied it to a timer circuit 661. Upon reception of the start signal, the timer circuit 661 starts a counting operation, and outputs an ON signal to the gate switch during this counting operation. Therefore, the gate switch shifts to the ON state.

On the other hand, the outputs from the amplifiers 652a to 652n are also guided to a mixer 656 to be mixed with each other. Assuming that the central equipment frequencies of the respective carriers are fca, fcb, fdb, . . . , an output from the mixer 656 includes a large number of frequency components represented by fca±fcb± . . . ±fda±fdb± . . . .

The output from the mixer 656 is input to bandpass filters (BPFS) 657a to 657n. One or some frequency components are extracted from the large number of frequency components by the BPFs 657a to 657n. The extracted frequencies are input to an AND gate 660 via an amplifier (not shown), wave detectors 658a to 658n and squelch circuits 659a to 659n. The input frequencies are ANDed and input to the timer circuit 661.

The timer circuit 661 has a function of compensating the stable operation of the GSU even if a plurality of transmission indication signals are transmitted from a single residence, and the transmission level of the transmission indication signal becomes unstable, as described above. That is, the timer circuit 661 is energized by the signal output from the AND gate 655 to turn on the gate switch, as described above. However, if no output from the AND gate 660 is detected within a predetermined time, the timer circuit 661 turns off the gate switch again. With this operation, even if the GSU receives a plurality of carriers whose central equipment frequencies coincide with each other due to a mischief or the like, the gate switch of the GSU is not kept in the ON state unless the frequencies of clock signals and parameters used in a modulation scheme or the like coincide with each other. For this reason, a malicious subscriber cannot continue to transmit an interference signal to the upward transmission path.

As for the above-described signal level, various control modes can be provided in accordance with control programs of the CPU 632. Assume that the frequency of each carrier is set within an upward band (e.g., both the ends of an upward band having poor group delay characteristics). In this case, when the carrier frequency is always set lower by 10 dB than the frequency of a data transmission signal so as to prevent troubles such as cross modulation caused by collision of the transmission indication signals with each other, the following control mode is effective. That is, the data transmission signal is received via a terminal 641, and its transmission level is detected to adjust the signal level of each carrier so as to be lower by 10 dB than the transmission level. Alternatively, a predetermined downward signal such as a pilot signal is received via the terminal 641, and the attenuation amount in the network is calculated from the received level. The transmission level of the data transmission signal is estimated on the basis of the calculated value to adjust the signal level of each carrier so as to be lower by 10 dB than the estimated level. Furthermore, such a control mode can be employed in which an absolute value is set to be lower than by 10 dB than the minimum level of the data transmission level (e.g., 85 to 120 dBfV) of a modem.

When the detection circuit includes a circuit having a relatively large power consumption, and the signal level of the transmission indication signal is set lower by about 10 dB than the level of the upward transmission signal, the transmission indication signal cannot supply all the power required for operations in the GSU. In this case, DC or AC power may be supplied from the G-MDM or the G-STB to the GSU, as described above.

To allow telephone communication in a disaster such as an earthquake, according to the services of public communication common carriers, DC power is supplied from an office power supply to telephones via telephone lines. To realize similar services on the cable network system, power must be supplied to a telephone modem via the drop cable 9. In this case, power must be supplied to both-the telephone modem and the telephone, resulting in an increase in required power. For example, AC power of about 100 V is sometimes used. The telephone modem of this type is set outside the residence in terms of a security measure for a subscriber. The AC power is cut off by this telephone modem, and only DC power required for an operation and a downward signal are introduced to an in-home device.

Figure 15A:
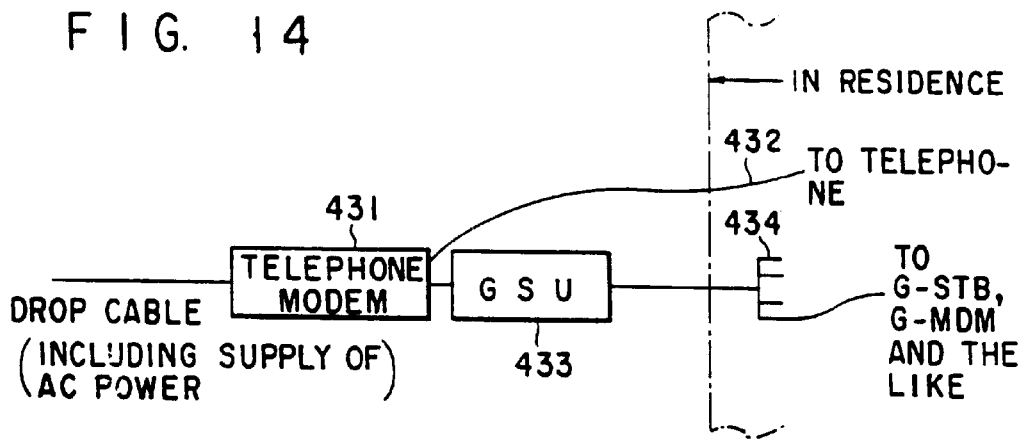
FIG. 15A is a view showing a connection between a telephone modem and the GSU.

FIG. 15A shows an example of the connection between the telephone modem, the GSU 30, and the like. Referring to FIG. 15A, the drop cable 9 also serving as an AC power supply path is first dropped in the a telephone modem 431. The telephone modem 431 comprises a DC power supply circuit. DC power is generated by the DC power supply circuit on the basis of AC power supplied via the drop cable 9. The DC power is supplied to an in-home telephone via a twisted pair line 432. A GSU 433 is connected between the telephone modem 431 and an in-home splitter 434. At this time, the AC power is not applied to the GSU 433 because the AC power is cut off by the telephone modem 431.

Note that the AC power is directly applied to the GSU attached to a subscriber residence in which no telephone modem is installed. However, since the AC power is cut off in the GSU, as described above, the AC power is not applied to an in-home device not to degrade the security.

Figure 15B:
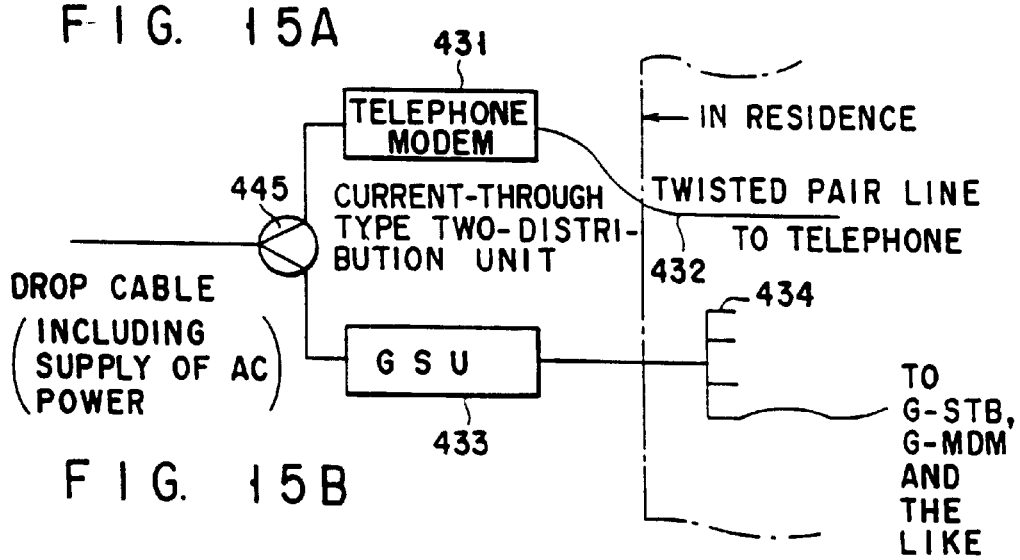
FIG. 15B is a view showing another connection between the telephone modem and the GSU.

When power must be constantly supplied to the GSU 30 via the drop cable 9, as described above, a current-through type two-branch splitter is provided to the end of the drop cable 9 to connect the telephone modem and the GSU parallel to each other, as shown in FIG. 15B. With this arrangement, power can be supplied to both the telephone modem and the GSU without applying a high voltage on the drop cable 9 to an in-home device.

Second Embodiment

According to the second embodiment of the present invention, a GSU attached tap-off as a unit obtained by incorporating a GSU in a tap-off main body is provided to a trunk line cable. Noise flowing from a connector open terminal of each subscriber residence is cut off by the GSU of the GSU attached tap-off.

FIG. 21 shows the arrangement of the GSU attached tap-off according to this embodiment. A GSU attached tap-off 470 is interposed and set in a trunk line cable 471. The GSU attached tap-off 470 is constituted by a tap-off 472, and a plurality of GSUs 473a to 473m connected to respective branched terminals. A G-MDM 32, a G-STB 31, and a NGA 34 in a subscriber residence are connected to these GSUs 473a to 473m via corresponding drop cables 474a to 474m. The GSUs 473a to 473m open/close upward transmission paths between the drop cables 474a to 474m and the tap-off 472 in accordance with transmission indication signals sent from the G-MDM 32, the G-STB 31, and the NGA 34 in the subscriber residence via the drop cables 474a to 474m.

With this arrangement, the GSU need not be installed in each subscriber residence. For this reason, a subscriber cannot remove or remodel the GSU. The reliability of the system can be further increased.

Note that the GSU attached tap-off can be modified as follows. FIG. 22 shows the arrangement. That is, a GSU attached tap-off 480 interposed in a trunk line cable 481 comprises a tap-off 482 for branching one cable from the trunk line cable 481, and a splitter 485 for branching this cable into a plurality of drop cables 484a to 484m. A GSU 483 is interposed between the tap-off 482 and the splitter 485. The GSU 483 opens/closes the upward transmission path between the splitter 485 and the tap-off 482 in accordance with transmission indication signals sent from a plurality of subscriber residences via the corresponding drop cables 474a to 474m.

With this arrangement, noise flowing from a connector open terminal of each subscriber residence is cut off by the GSU 483 not to flow into the trunk line cable 481, as a matter of course. In addition, it becomes difficult for a subscriber or the like to touch the GSU 483 with his/her hand by accommodating the GSU 483 in the GSU attached tap-off 480, similar to the arrangement shown in FIG. 21. Furthermore, one GSU is provided to a plurality of subscribers. Therefore, investments on cable network system industrial companies or subscribers can be reduced.

In the arrangement of FIG. 22, one GSU 483 is provided to a plurality of drop cables. When the GSU 483 is turned on, the amount of noise flowing from the respective subscriber residences increases.

Third Embodiment

According to the third embodiment of the present invention, a self-terminated type gate switch unit (S-GSU) as a unit obtained by combining an NGA with a GSU is arranged to eliminate a GSU associated modem, an STB, or an NGA from an in-home device.

Figure 23:
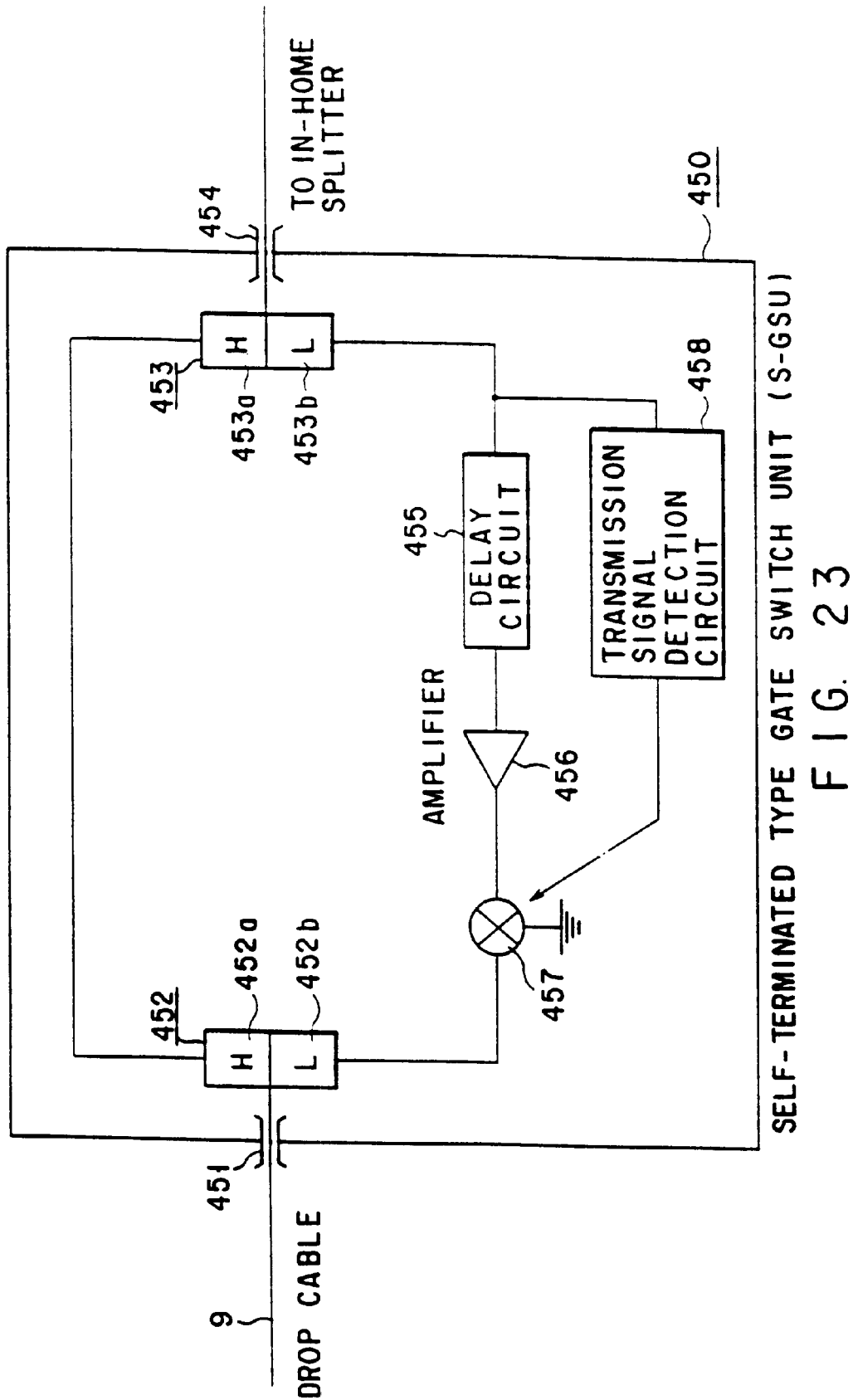
FIG. 23 is a block diagram showing the arrangement of a self-terminated type gate switch unit (S-GSU) according to the third embodiment of the present invention.
Figure 27:
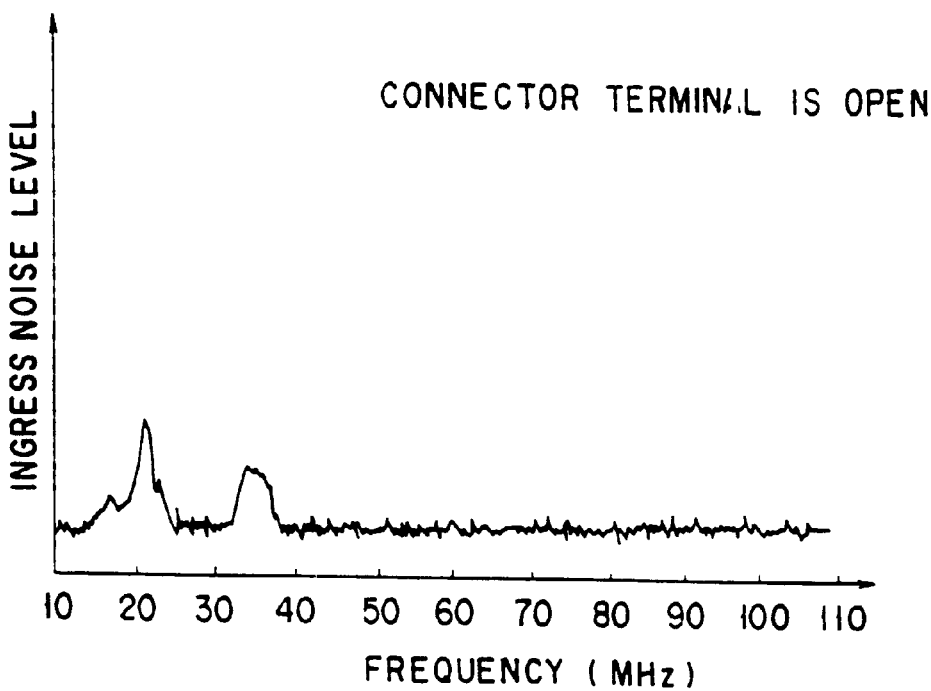
FIG. 27 is a graph showing the spectrum distribution of noise flowing from a connector open terminal.
Figure 28:
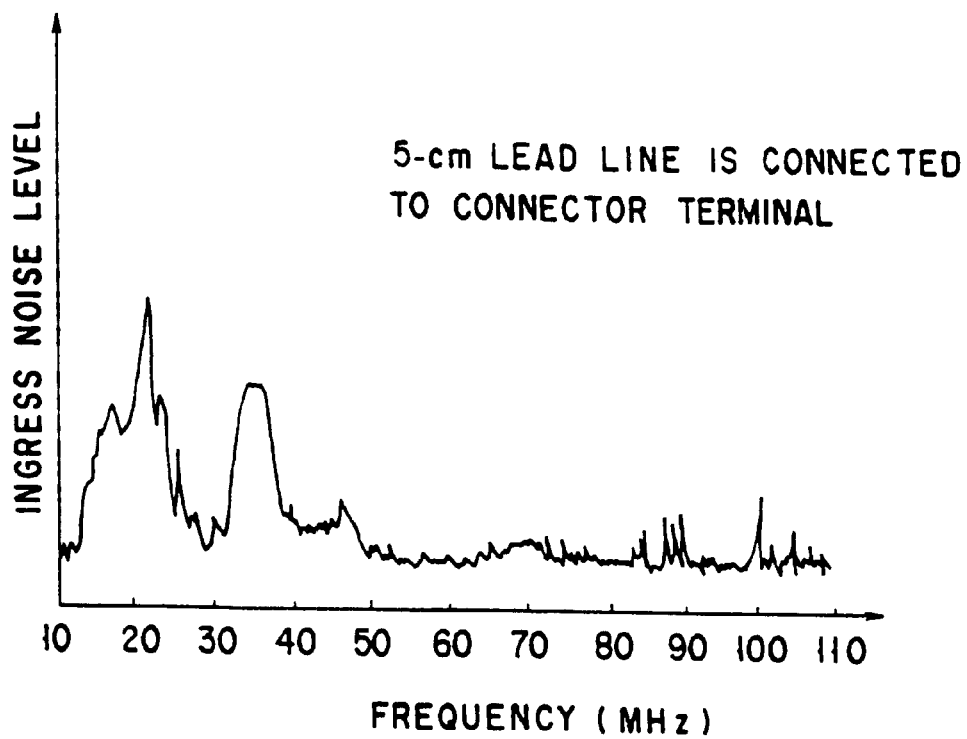
FIG. 28 is a graph showing the spectrum distribution of inflow noise when a lead wire is connected to the connector open terminal.
Figure 31:
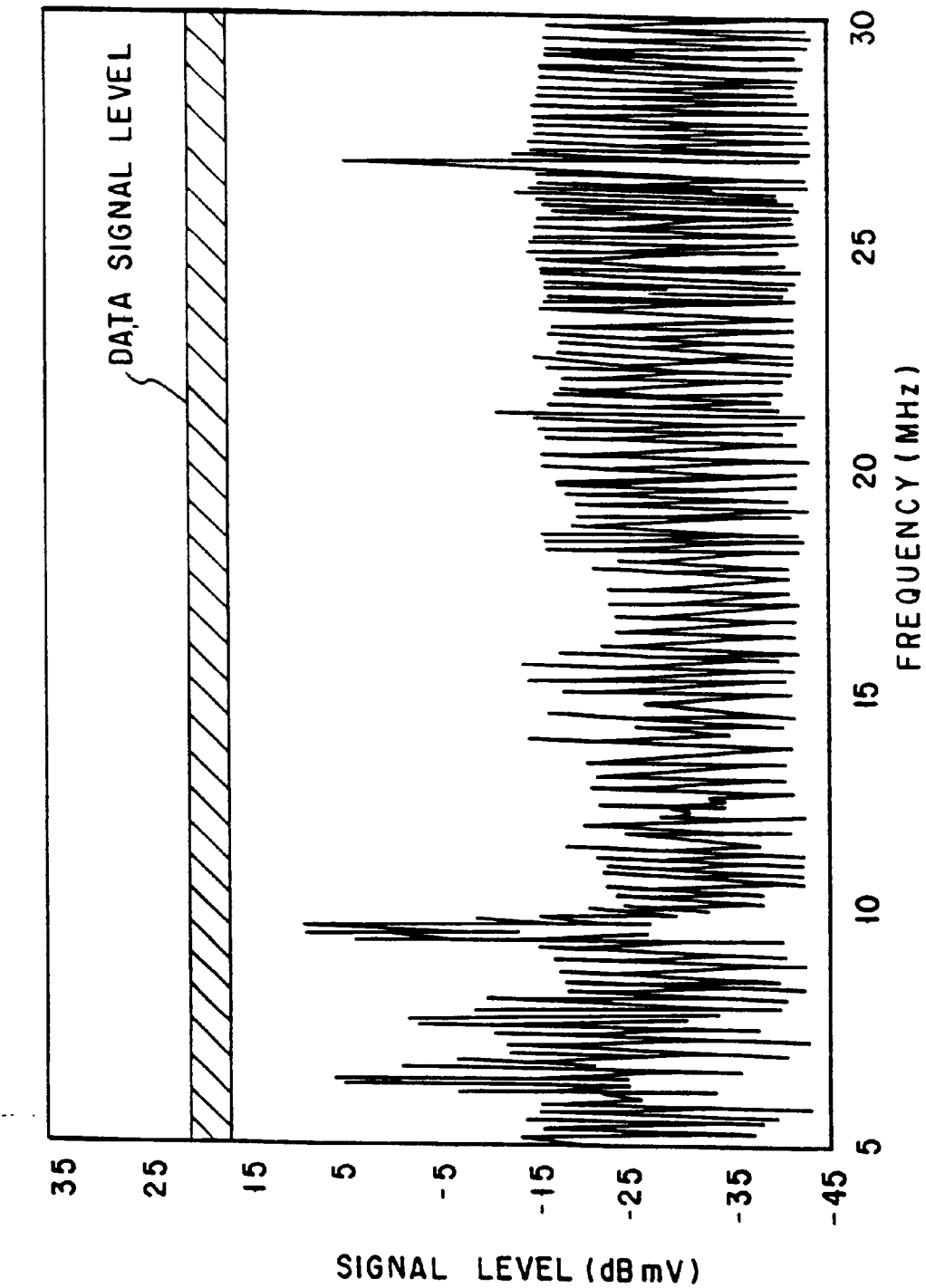
FIG. 31 is a graph showing comparison between the spectrum distribution of ingress noise observed on an upward transmission path in a state having no data transmission signal, and the assumed level of a data signal.

FIG. 23 is a block diagram showing the arrangement of an S-GSU according to this embodiment. An S-GSU 450 comprises first and second frequency band separation circuits 452 and 453, a gate switch 457, a transmission signal detection circuit 458, a delay circuit 455, and an amplifier 456.

The first and second frequency band separation circuits 452 and 453 comprise filters 452*a* and 452*b* and filters 453*a* and 453*b* for separating a frequency band H in the downward direction and a frequency band L in the upward direction, respectively. The first and second frequency band separation circuits 452 and 453 are connected to connectors 451 and 454, respectively.

The gate switch 457 is interposed and set in an upward signal path between the second frequency band separation circuit 453 and the first frequency band separation circuit 452. The ON/OFF state of the gate switch 457 is controlled by a switch control signal output from the transmission signal detection circuit 458. The transmission signal detection circuit 458 detects an upward transmission signal transmitted from an N-STB 33 or an N-MDM 35. While the upward transmission signal is detected, the transmission signal detection circuit 458 generates the switch control signal and supplies it to the gate switch 457.

FIG. 24 shows the timing relationship between the switch control signal and the upward transmission signal. Referring to FIG. 24, when the upward transmission signal is sent from the N-STB 33 or the N-MDM 35, the switch control signal output from the transmission signal detection circuit 458 becomes active a time t18 after this moment. Upon reception of the switch control signal, the gate switch 457 is turned on almost simultaneously. The upward transmission signal is delayed by the delay circuit 455 a time t19 after this operation, and amplified by the amplifier 456. The resultant signal starts to pass through the gate switch 457. On the other hand, the switch control signal becomes inactive a time t20 after the upward transmission signal substantially disappears, and the gate switch 457 is returned to the OFF state. The upward transmission signal has already passed through the gate switch 457 a time t21 before this operation.

As described above, according to this embodiment, the gate switch unit is constituted to be of the self-terminated type. No additional function need be provided to an in-home modem or STB. Therefore, an increase in cost due to a new modem or STB can be suppressed. In addition, when existing or new services are to be developed, the presence of the GSU need not be considered.

To the contrary, the S-GSU 450 is expensive. The supply of power from a modem or the like cannot be expected, so that power must be supplied from a commercial AC power supply or the like in installation of the S-GSU 450. An increase in work cost is inevitable.

Fourth Embodiment

In the system according to each of the first to third embodiments described above, while an in-home device does not transmit an upward data signal, the ingress noise is cut off by the GSU not to flow into the upward transmission path as far as the GSU functions properly. However, since the GSU is in the ON state in the transmission period of the upward data signal, noise is sent to the upward transmission path together with the upward data signal. A problem is posed when, for example, a subscriber erroneously directly connects a data device such as a personal computer to a connector terminal to flow strong noise to the upward transmission path. In this case, the noise cannot be blocked by only the GSU.

The fourth embodiment of the present invention copes with such a situation. An ingress noise monitoring/analysis device is provided to a distribution hub located on the upstream of a bidirectional transmission path. The ingress noise monitoring/analysis device observes the noise level included in the upward signal sent via a fiber node and checks whether this noise adversely affects the transmission quality. When it is determined that the noise adversely affects the quality, a subscriber as the generation source of the noise is estimated from a data transmission source subscriber identification number. Information on the estimated subscriber is notified to the network management system, together with the noise level determination result. With this operation, maintenance personnel of the system can investigate the noise generation source on the basis of the information notified from the ingress noise monitoring/analysis device, and can take a required action.

The fourth embodiment will be described in detail below with reference to the accompanying drawings. The basic part of the system in this embodiment is also the same as that described in the first embodiment, and the fourth embodiment will be described with reference to FIG. 1.

Referring to FIG. 1, an ingress noise monitoring/analysis device 40 is arranged in a distribution hub 2 located on the upstream of the bidirectional transmission path. FIG. 25 is a block diagram showing the arrangement of the distribution hub 2 provided with the ingress noise monitoring/analysis device 40.

The distribution hub 2 comprises a plurality of central control units 501*a* to 501*n*. The central control units 501*a* to 501*n* perform various kinds of control and modulation/demodulation processing in a manner interlocked with the above-described G-MDM 32 and G-STB 31. These control and modulation/demodulation processing are required to provide the PC on-line services and the VOD services. Downstream signals output from the central control units 501*a* to 501*n* are synthesized with each other by a multiplexer 502. The synthesized electric signal is converted into an optical signal by an electrical-to-optical converter (E/O) 503. The optical signal is branched into a plurality (k in FIG. 25) of systems by an optical demultiplexer 504. The resultant signals are transmitted to fiber nodes #a to #k.

On the other hand, the optical signals as upward data signals sent via the fiber nodes #a to #k are converted into electrical signals by optical-to-electric converters (O/E) 510*a* to 510*k*. The electric signals are branched into n systems by demultiplexers 511a to 511k. The resultant signals are input to the corresponding central control units 501a to 501n. The central control units 501a to 501n send the received upward data signals to a headend 1. At the same time, the central control units 501a to 501n extract transmission source subscriber identification numbers from header information added to the respective upward data signals and notify the identification numbers to the ingress noise monitoring/analysis device 40.

The ingress noise monitoring/analysis device 40 is constituted as shown in FIG. 26. More specifically, upward signals 521a to 521k sent via the fiber nodes #a to #k are input to a spectrum analyzer 530 via a switch 533. The spectrum analyzer 530 observes a spectrum distribution in an upward frequency band by keeping the peak thereof for, e.g., every 5 minutes. The observation data are input to an analysis device 531. The analysis device 531 receives the observation data together with the data transmission source subscriber identification numbers output from the central control units 501a to 501n during the observation period of 5 minutes. Analysis processing in the analysis device 531 is schematically constituted by, e.g., the following steps.

(1) Primary Process

The presence of a corresponding spectrum is checked on the basis of channel information notified in advance from a network management system installed in the headend, which information is assigned to each service in the upward frequency band. If the corresponding spectrum is present, the spectrum component is removed from the observation data. Note that the channel information includes a central equipment frequency, an occupied bandwidth, a signal level, and a spectrum distribution.

(2) Secondary Process

Noise components constantly and stably observed in past noise information files accumulated in an auxiliary memory device 532 are removed from the result of the primary process.

(3) Tertiary Process

Upon completion of the secondary process, noise components left without being removed are classified into, e.g., the following three stages in accordance with the intensities of the levels.

E (Emergency) level: noise level greatly affecting the transmission quality

W (Warning) level: middle warning noise level between the E level and an S level (to be described below)

S (Safety) level: noise level negligible in terms of the transmission quality (4) Quartic Process Noise of the E level and noise of the W level are collated with the past noise information files accumulated in the auxiliary memory device 532. Each past noise information file includes data representing the characteristics of noise such as a frequency, a bandwidth, a noise level, intermittency/continuity, a data transmission source subscriber number obtained when the noise is observed. When similar noise is detected by this collation, a coincidence count is incremented for the newly received data transmission source subscriber identification number which coincides with the data transmission source subscriber number accumulated in the noise information file. If the coincidence count of the transmission source subscriber identification number does not reach a predetermined number, or the transmission source subscriber identification number fails to be read as a data transmission source many times, the transmission source subscriber identification number is deleted from the noise information files. In addition, noise whose similarity cannot be detected is registered as a new noise information file in the auxiliary memory device 532. As for at least noise of the E level, the generation of this noise is notified to the network management system to warn the maintenance/operation person of the system.

(5) Quintic Process

It is estimated that the generation source of the noise is or may be a subscriber residence having the file, of the noise information files, in which the coincidence count of the data transmission source subscriber identification number reaches the predetermined standard. This estimation is notified to the network management system to request the maintenance person of the system to make investigation and take required action. The ingress noise monitoring/analysis device 40 constantly, repeatedly performs the above processes sequentially for all the fiber nodes.

Even when, therefore, a subscriber erroneously directly connects a personal computer or the like to the transmission path, strong noise having passed through the GSU 30 in the ON state and transmitted to the upward transmission path is monitored and analyzed by the ingress noise monitoring/ analysis device while data is being transmitted. The subscriber as the transmission source is estimated. This estimation is notified to the network management system. The maintenance/operation personnel of the system can quickly take a proper action.

The description above is based on the assumption that the network management system is located at the head end. Instead, the network management system may be connected by a communication line to the head end. In this case, the ingress noise monitoring/analysis device 40 supplies the estimation result to the network management system through the head end and the communication line.

The above-described spectrum analyzer can be constituted by a filter group having a bandwidth corresponding to the measurement resolution (e.g., 300 kHz). That is, the spectrum analyzer as a commercially available standard measurement device scans a measurement Frequency band with the resolution set by a user in a software manner. Intermittent noise which disappears within a very short time, or the like cannot always be detected. However, such noise can be reliably detected by real-time observation using the above-described filter group.

In the above description, the observation time of noise is set to, e.g., 5 minutes. However, when noise of E or W level is detected, the observation time for a corresponding fiber node is shortened, or the observation frequency for the corresponding fiber node is increased compared to the remaining fiber nodes. Further, a fiber node where a bit error on an upward data signal typically increases is observed concentratedly. With this setting, a time required to estimate the subscriber of a noise generation source can be shortened.

The present invention is not limited to the respective embodiments. For example, the self-terminated type GSU described in the third embodiment may be arranged instead of the GSUs 473a to 473m and 483 described in the second embodiment.

When a surge suppresser unit is set under the eaves of a subscriber residence, or a splitter is installed in the residence, the GSU may be accommodated in the unit.

A bidirectional booster amplifier and a splitter may be inserted midway along the drop cable 9 branched from a trunk line cable 6 to distribute services to a plurality of subscribers. In this case, the bidirectional booster amplifier may comprise the GSU function including a gate switch function and the like, or the self-terminated type GSU function including a gate switch function and a delay function for a transmission signal. The bidirectional booster amplifier and the GSU share a frequency band separation circuit, an amplifier, and the like, which are required for the GSU function and the self-terminated type GSU function. As a result, the GSU can be reduced in cost. Note that the amount of ingress noise increases in this scheme because a plurality of subscribers share the GSU. As a matter of course, the GSU may be inserted immediately after an in-home splitter, i.e., the GSU may be inserted for each subscriber. In this case, although the cost of the GSU cannot be greatly reduced, the work cost can be reduced because the installation work for each subscriber is eliminated.

The timing between the transmission indication signal, the switch control signal, and the upward transmission signal can be arbitrarily set. For example, even when the transmission indication signal disappears earlier than the upward transmission signal, if the time constant of the transmission indication detection circuit in the GSU is set large, the ON state can be kept until the upward transmission signal disappears. That is, it is sufficient that the upward transmission path is kept open during a period in which the upward transmission signal passes through the GSU. Various methods can be considered to realize this condition.

Various control schemes can be considered for a supply scheme of power to the GSU by the transmission indication signal, measures against collision of signals with each other, measures for noise discrimination, measures against a malicious interferer.

Furthermore, the target cable network system in the respective embodiments uses a so-called low-split scheme in which the frequency bandwidth in the upward direction is as narrow as 5 MHz to 40 or 48 MHz. The present invention can be applied to a mid-split or high-split scheme having a broader band. The present invention can also be applied to a double cable scheme in which coaxial cables are respectively assigned to upward and downward transmission paths, an optical passive coupling system such as FTTH, and an optical system in which a malicious subscriber may send an interference signal to an optical shared transmission path via an optical terminating unit (ONU: Optical Network Unit). In addition, each embodiment exemplifies the system in which bidirectional transmission is performed between the subscriber device and the central equipment via the bidirectional transmission path. The present invention can also be applied to a system in which data obtained by the inspection of a meter are transmitted from a large number of subscribers to the central equipment, like a collecting system for meter inspection data. Further, the present invention can also be applied to a cable network system using either a coaxial cable as a transmission medium and an optical fiber cable or a twisted pair line.

The circuit configuration and installation location of the GSU, the function and installation location of the ingress noise monitoring/analysis device 40, and the like can be modified without departing from the spirit and scope of the present invention.

The cable network system is not limited to a star-shaped one and a tree-shaped one. Rather, it may be of any other type such as a ring-shaped one. The system may have any structure in which ingress noise may be generated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A transmission path opening/closing device comprising:

transmission path opening/closing means provided in at least one bidirectional transmission path of a cable network system for bidirectional transmitting signals between at least one central equipment and at least one subscriber device via said bidirectional transmission path, said transmission path opening/closing means setting at least one upward transmission path of said bidirectional transmission path in a conductive state during a period when at least one upward signal transmitted from said subscriber device to said central equipment passes through said means, and setting said upward transmission path in a cutoff state during a remaining period;

wherein said transmission path opening/closing means comprises at least one switch control section arranged corresponding to said subscriber device, and at least one gate switch section arranged in said bidirectional transmission path, said switch control section comprising at least one of means for detecting a transmission period of the upward signal from said subscriber device, and means for receiving notification information representing the transmission period of the upward signal generated by said subscriber device, and comprising means for generating a transmission indication signal representing the transmission period on the basis of a detection result of the transmission period or the received notification information, and sending the transmission indication signal to said bidirectional transmission path, and said gate switch section comprising means for setting said upward transmission path of said bidirectional transmission path in the conductive state during the period when the upward signal transmitted from said subscriber device passes through said gate switch section, and setting said upward transmission path in the cutoff state during the remaining period, in accordance with the transmission indication signal sent from said switch control section;

wherein said switch control section sends a carrier having undergone spectrum spreading in accordance with a predetermined spread code sequence, as the transmission indication signal, and said gate switch section reversely spreads and reproduces the transmission indication signal, sent from said switch control section, in accordance with the predetermined spread code sequence to open/close the upward transmission path of said bidirectional transmission path in accordance with the reproduced transmission indication signal.

2. A transmission path opening/closing device comprising:

transmission path opening/closing means provided in at least one bidirectional transmission path of a cable network system for bidirectional transmitting signals between at least one central equipment and at least one subscriber device via said bidirectional transmission path, said transmission path opening/closing means setting at least one upward transmission path of said bidirectional transmission path in a conductive state during a period when at least one upward signal transmitted from said subscriber device to said central equipment passes through said means, and setting said upward transmission path in a cutoff state during a remaining period;

wherein said transmission path opening/closing means comprises at least one switch control section arranged corresponding to said subscriber device, and at least one gate switch section arranged in said bidirectional transmission path, said switch control section comprising at least one of means for detecting a transmission period of the upward signal from said subscriber device, and means for receiving notification information representing the transmission period of the upward signal generated by said subscriber device, and comprising means for generating a transmission indication signal representing the transmission period on the basis of a detection result of the transmission period or the received notification information, and sending the transmission indication signal to said bidirectional transmission path, and said gate switch section comprising means for setting said upward transmission path of said bidirectional transmission path in the conductive state during the period when the upward signal transmitted from said subscriber device passes through said gate switch section, and setting said upward transmission path in the cutoff state during the remaining period, in accordance with the transmission indication signal sent from said switch control section;

wherein said switch control section comprises means for sending, by using a plurality of carriers, respective transmission indication signals having undergone signal processing using a preset parameter, and said gate switch section comprises means for receiving and reproducing the respective transmission indication signals sent from said switch control section by using the plurality of carriers, means for setting said upward transmission path of said bidirectional transmission path in the conductive state when all the transmission indication signals with the plurality of carriers are reproduced, and means for checking whether the plurality of reproduced transmission indication signals having undergone the signal processing using the parameter, and, if NO, restoring said upward transmission path of said bidirectional transmission path to the cutoff state.

3. A transmission path opening/closing device comprising:

transmission path opening/closing means provided in at least one bidirectional transmission path of a cable network system for bidirectional transmitting signals between at least one central equipment and at least one subscriber device via said bidirectional transmission path, said transmission path opening/closing means setting at least one upward transmission path of said bidirectional transmission path in a conductive state during a period when at least one upward signal transmitted from said subscriber device to said central equipment passes through said means, and setting said upward transmission path in a cutoff state during a remaining period;

wherein said transmission path opening/closing means comprises at least one switch control section arranged corresponding to said subscriber device, and at least one gate switch section arranged in said bidirectional transmission path, said switch control section comprising at least one of means for detecting a transmission period of the upward signal from said subscriber device, and means for receiving notification information representing the transmission period of the upward signal generated by said subscriber device, and comprising means for generating a transmission indication signal representing the transmission period on the basis of a detection result of the transmission period or the received notification information, and sending the transmission indication signal to said bidirectional transmission path, and said gate switch section comprising means for setting said upward transmission path of said bidirectional transmission path in the conductive state during the period when the upward signal transmitted from said subscriber device passes through said gate switch section, and setting said upward transmission path in the cutoff state during the remaining period, in accordance with the transmission indication signal sent from said switch control section;

wherein at least one of said switch control section and said gate switch section comprises signal delay means for delaying the upward signal by a time required for said gate switch section to set said upward transmission path in the conductive state in accordance with the transmission indication signal after said subscriber device starts to transmit the upward signal;

wherein said signal delay means comprises means for converting a first frequency of the upward signal into a second frequency higher than the first frequency, means for delaying the upward signal converted to have the second frequency by the required time, and means for returning the frequency of the delayed upward signal to the first frequency.

4. A transmission path opening/closing device comprising:

transmission path opening/closing means provided in at least one bidirectional transmission path of a cable network system for bidirectional transmitting signals between at least one central equipment and at least one subscriber device via said bidirectional transmission path, said transmission path opening/closing means setting at least one upward transmission path of said bidirectional transmission path in a conductive state during a period when at least one upward signal transmitted from said subscriber device to said central equipment passes through said means, and setting said upward transmission path in a cutoff state during a remaining period;

wherein said transmission path opening/closing means comprises at least one switch control section arranged corresponding to said subscriber device, and at least one gate switch section arranged in said bidirectional transmission path, said switch control section comprising at least one of means for detecting a transmission period of the upward signal from said subscriber device, and means for receiving notification information representing the transmission period of the upward signal generated by said subscriber device, and comprising means for generating a transmission indication signal representing the transmission period on the basis of a detection result of the transmission period or the received notification information, and sending the transmission indication signal to said bidirectional transmission path, and said gate switch section comprising means for setting said upward transmission path of said bidirectional transmission path in the conductive state during the period when the upward signal transmitted from said subscriber device passes through said gate switch section, and setting said upward transmission path in the cutoff state during the remaining period, in accordance with the transmission indication signal sent from said switch control section;

wherein at least one of said switch control section and said gate switch section comprises signal delay means for delaying the upward signal by a time required for said gate switch section to set said upward transmission path in the conductive state in accordance with the transmission indication signal after said subscriber device starts to transmit the upward signal;

wherein said signal delay means comprises a plurality of delay elements for dividing a band of the upward signal into a plurality of bands, and delaying the upward signal for each band.

5. An adaptor device attached to at least one subscriber device used in a cable network system having at least one bidirectional transmission path and in which at least one gate switch section for opening/closing at least one upward transmission path of said bidirectional transmission path is provided to perform bidirectional transmission of signals between at lest one central equipment and said subscriber device via said bidirectional transmission path, comprising:

at least one switch control means for generating a transmission indication signal representing a transmission period on the basis of a detected transmission period or a received notification information sent from said subscriber device, and sending the transmission indication signal to said gate switch section, thereby controlling an opening/closing operation of said gate switch section, said switch control section having at least one of means for detecting a transmission period of at least one upward signal from said subscriber device to said central equipment and means for receiving notification information representing the transmission period of the upward signal generated by said subscriber device; and signal delay means for delaying the upward signal by a time required for said gate switch section to set said upward transmission path in conductive state in accordance with the transmission indication signal after said subscriber device starts to transmit the upward signal to said central equipment;

wherein said switch control means sends a transmission indication signal having undergone spectrum spreading in accordance with a predetermined spread code sequence.

6. A cable network system for bidirectionally transmitting signals between at least one central equipment and at least one subscriber device via at least one bidirectional transmission path, comprising:

at least one transmission path opening/closing device provided in said bidirectional transmission path to set at least one upward transmission path of said bidirectional transmission path in a conductive state during a period when at least one upward signal is transmitted from said subscriber device to said central equipment and set said upward transmission path in a cutoff state during a remaining period; and at least one ingress noise monitoring/analysis device set in a portion of said bidirectional transmission path, through which undesired signals containing at least ingress noise pass, said ingress noise monitoring/analysis device comprising,
noise monitoring means for monitoring noise on said upward transmission path which has passed through said transmission path opening/closing device,
determination means for determining a degree of influence of the noise on a transmission quality of said upward transmission path on the basis of monitoring data obtained by said noise monitoring means,
coupling means to said central equipment for obtaining source information of upward signals transmitted from said subscriber device to said central equipment,
estimation means for extracting noise originating source information by correlating the noise monitored by said noise monitoring means and the source information of the upward signals received by said coupling means, thereby estimating at least one noise originating source which has transmitted the upward signals passed together with the noise through said transmission path opening/closing device, and
notification means for notifying a determination result obtained by said determination means and an estimation result obtained by said estimation means to said central equipment.

7. A system according to claim 6, wherein said notification means notifies to a central network management device the determination result obtained by said determination means and the estimation result obtained by said estimation means, in the case where said central network management device is provided in said central equipment.

8. A system according to claim 6, wherein said notification means notifies to a central network management device the determination result obtained by said determination means and the estimation result obtained by said estimation means through said central equipment and a communication line, in the case where said central network management device is connected by the communication line to said central equipment.

9. An ingress noise monitoring/analysis device set in a portion of at least one bidirectional transmission path, through which undesired signals containing at least ingress noise pass, for use in a cable network system having said bidirectional transmission path and in which at least one gate switch device for opening/closing at least one upward transmission path of said bidirectional transmission path is provided to perform bidirectional transmission of signals between at least one central equipment and a subscriber, said ingress noise monitoring/analysis device comprising:

noise monitoring means for monitoring on said upward transmission path noise which has passed through said gate switch device,
determination means for determining a degree of influence of the noise on a transmission quality of said upward transmission path on the basis of monitoring data obtained by said noise monitoring means,
coupling means to said central equipment for obtaining source information of upward signals transmitted from said subscriber to said central equipment,
estimation means for extracting noise originating source information by correlating the noise monitored by said noise monitoring means and the source information of the upward signals received by said coupling means, thereby estimating at least one noise originating source which has transmitted the upward signals passed together with the noise through said gate switch device, and
notification means for notifying a determination result obtained by said determination means and an estimation result obtained by said estimation means to said central equipment.

10. A device according to claim 9, wherein said noise monitoring means comprises a plurality of filters having bandwidths equivalent to measurement resolutions, thereby simultaneously monitoring target frequency bands with said filters.

11. A device according to claim 9, wherein, when said bidirectional transmission path as a monitoring target is branched into a plurality of branch transmission paths, said noise monitoring means sequentially monitors noise on each of said plurality of branch transmission paths for a predetermined time, and when one of said branch transmission paths on which a degree of influence of the noise exceeds a predetermined level is found, monitors the branch transmission path more intensively than the remaining branch transmission paths.

12. A device according to claim 9, wherein said notification means notifies to a central network management device the determination result obtained by said determination means and the estimation result obtained by said estimation means, in the case where said central network management device is provided in said central equipment.

13. A device according to claim 9, wherein said notification means notifies to a central network management device the determination result obtained by said determination means and the estimation result obtained by said estimation means through said central equipment and a communication line, in the case where said central network management device is connected by the communication line to said central equipment.

* * * * *

UNITED STATES PATENT AND TRADEMARK OFFICE
CERTIFICATE OF CORRECTION

PATENT NO. : 6,530,087 B1
DATED : March 4, 2003
INVENTOR(S) : Kobayashi et al.

It is certified that error appears in the above-identified patent and that said Letters Patent is hereby corrected as shown below:

<u>Title page,</u>
Item [63], Related U.S. Application Data, should read:

-- Related U.S. Application Data

[63]  Continuation of application No. 09/417,017, filed on Oct. 12, 1999, now Pat. No. 6,160,990, which is a continuation of application No. 08/717,296, filed on Sep. 20, 1996, now abandoned. --

Signed and Sealed this

Twenty-fourth Day of June, 2003

JAMES E. ROGAN
*Director of the United States Patent and Trademark Office*